(12) United States Patent
Bai et al.

(10) Patent No.: US 11,128,677 B2
(45) Date of Patent: Sep. 21, 2021

(54) NETWORK CALL METHOD, SERVER, CALL TERMINAL, NETWORK CALL SYSTEM, AND STORAGE MEDIUM

(71) Applicant: TENCENT TECHNOLOGY (SHENZHEN) COMPANY LIMITED, Shenzhen (CN)

(72) Inventors: Xingshi Bai, Shenzhen (CN); Yan Ouyang, Shenzhen (CN); Jian Qiu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/779,810

(22) Filed: Feb. 3, 2020

(65) Prior Publication Data

US 2020/0177642 A1 Jun. 4, 2020

Related U.S. Application Data

(63) Continuation of application No. PCT/CN2018/097249, filed on Jul. 26, 2018.

(30) Foreign Application Priority Data

Aug. 3, 2017 (CN) .......................... 201710657589.6

(51) Int. Cl.
*H04L 29/06* (2006.01)
*H04M 3/42* (2006.01)
(Continued)

(52) U.S. Cl.
CPC ...... *H04L 65/1069* (2013.01); *H04L 65/1073* (2013.01); *H04M 3/42042* (2013.01); *H04W 4/14* (2013.01); *H04W 4/21* (2018.02)

(58) Field of Classification Search
CPC . H04L 65/1069; H04L 29/08; H04L 65/1073; H04L 65/4015; H04L 12/18;
(Continued)

(56) References Cited

U.S. PATENT DOCUMENTS

| | | | |
|---|---|---|---|
| 6,594,257 B1 * | 7/2003 | Doshi | H04L 29/06 370/352 |
| 7,003,087 B2 * | 2/2006 | Spencer | H04M 3/436 379/211.01 |

(Continued)

FOREIGN PATENT DOCUMENTS

| | | |
|---|---|---|
| CN | 1529489 A | 9/2004 |
| CN | 101102213 A | 1/2008 |

(Continued)

OTHER PUBLICATIONS

The State Intellectual Property Office of the People's Republic of China (SIPO) Office Action 1 for 201710657589.6 dated Oct. 10, 2020 11 Pages (including translation).

(Continued)

*Primary Examiner* — Abdullahi E Salad
(74) *Attorney, Agent, or Firm* — Anova Law Group, PLLC

(57) ABSTRACT

A network call method, a server, a call terminal, a network call system, and a storage medium are provided. The network call method includes: receiving a reservation request transmitted by a call reservation terminal, the reservation request including a first communication identifier of a first call terminal; generating a chat room identifier of a chat room in a social network application; generating a call reservation notification, the call reservation notification including an access link generated according to the chat room identifier; and transmitting the call reservation notification to a communication client of the first call terminal (Continued)

according to the first communication identifier of the first call terminal.

20 Claims, 25 Drawing Sheets

(51) Int. Cl.
*H04W 4/21* (2018.01)
*H04W 4/14* (2009.01)

(58) Field of Classification Search
CPC ......... H04W 4/21; H04W 4/14; H04M 3/565; H04M 3/42042; H04M 2203/5054; H04M 2203/652; H04M 2203/655
See application file for complete search history.

(56) References Cited

U.S. PATENT DOCUMENTS

| | | | | |
|---|---|---|---|---|
| 7,680,488 | B2* | 3/2010 | O'Leary | H04M 3/42042 455/412.2 |
| 2005/0053216 | A1* | 3/2005 | Spencer | H04M 3/436 379/211.01 |
| 2008/0146198 | A1* | 6/2008 | O'Leary | H04L 51/24 455/412.2 |
| 2008/0168138 | A1 | 7/2008 | Simpson | |
| 2009/0154680 | A1* | 6/2009 | Weiss | H04M 3/42042 379/207.16 |
| 2010/0036697 | A1 | 2/2010 | Kelnar | |
| 2014/0362742 | A1* | 12/2014 | Martinez | H04L 65/403 370/262 |
| 2018/0192000 | A1* | 7/2018 | Mercredi | G06K 9/00302 |

FOREIGN PATENT DOCUMENTS

| | | |
|---|---|---|
| CN | 101119218 A | 2/2008 |
| CN | 101127767 A | 2/2008 |
| CN | 101159901 A | 4/2008 |
| CN | 101257395 A | 9/2008 |
| CN | 101257395 B | 12/2010 |
| CN | 103841007 A | 6/2014 |
| CN | 104734942 A | 6/2015 |
| CN | 105049319 A | 11/2015 |
| CN | 106657697 A | 5/2017 |
| EP | 2154820 A1 | 2/2010 |
| JP | 2004240932 A | 8/2004 |

OTHER PUBLICATIONS

Taiwan Intellectual Property Office Examination report for Application No. 10821035390 dated Oct. 31, 2019 9 pages (including translation).
Thome, "IBM Lotus Sametimes 8.5 enhances enterprise integration applications through the development of plug-in modules," (URL: https://www.ithome.com.tw/review/91929), Mar. 25, 2011, (ibm notes Instant messaging) 12 pages (including translation).
The World Intellectual Property Organization (WIPO) International Search Report for PCT/CN2018/097249 dated Nov. 1, 2018 5 Pages (including translation).

\* cited by examiner

| Second communication identifier | Identity identifier | Chat room identifier |
|---|---|---|
| 1234567 | 1 | 11111 |
| 2345678 | 1 | 11111 |
| 3456789 | 2 | 11111 |

NETWORK CALL METHOD, SERVER, CALL TERMINAL, NETWORK CALL SYSTEM, AND STORAGE MEDIUM

RELATED APPLICATIONS

This application claims priority to PCT Application No. PCT/CN2018/097249, filed on Jul. 26, 2018, which in turn claims priority to Chinese Patent Application No. 201710657589.6, entitled "NETWORK CALL METHOD, APPARATUS, AND SYSTEM" and filed on Aug. 3, 2017, which are both incorporated by reference in its entirety.

FIELD OF THE TECHNOLOGY

This application relates to the field of computers, and in particular, to a network call method, a server, a call terminal, a network call system, and a storage medium.

BACKGROUND OF THE DISCLOSURE

A network call is a call performed by using a network communications technology. A network call enables geographically dispersed users to gather in a chat room, and exchange information in a plurality of manners including images and voice.

During a network call, a network call client is installed in a call reservation terminal. The call reservation terminal logs in to the network call client by using a call initiator communication identifier, and determines a friend communication identifier that has a friend relationship with the initiator communication identifier in the network call client. The call reservation terminal transmits a chat room creation request to a server corresponding to the network call client. The chat room creation request carries the initiator communication identifier and the friend communication identifier. The server creates a chat room according to the chat room creation request. The chat room includes the initiator communication identifier and the friend communication identifier. A call terminal corresponding to the friend communication identifier performs the network call through the chat room.

The initiator communication identifier is used for logging in to the network call client in the call reservation terminal. The friend communication identifier that has a friend relationship with the initiator communication identifier is a communication identifier that is bound with the initiator communication identifier in advance and that is displayed in the network call client of the call reservation terminal.

The call reservation terminal can determine a communication identifier to participate in the network call only from friend communication identifiers that have a friend relationship with the initiator communication identifier. A communication identifier that does not have a friend relationship with the initiator communication identifier cannot be added into the chat room. Consequently, a call party that is not a friend with the initiator cannot participate in the network call using the communication identifier.

SUMMARY

Embodiments of this application provide a network call method, a computer device, a network call system, and a storage medium.

One aspect of the present disclosure provides a network call method for making a call in a chat room. The method includes receiving, by a first server, a reservation request transmitted by a call reservation terminal, the reservation request comprising a first communication identifier of a first call terminal, a communication client being installed in the first call terminal, and the first communication identifier being a communication identifier corresponding to the communication client; generating, by the first server, a chat room identifier of a chat room in a social network application, the chat room being used by at least two call terminals to perform a network call, and the at least two call terminals comprising the first call terminal; generating, by the first server, a call reservation notification, the call reservation notification comprising an access link generated according to the chat room identifier; and transmitting, by the first server, the call reservation notification to the first call terminal according to the first communication identifier, the call reservation notification being used for instructing the first call terminal to invoke a network call client through the communication client according to the access link, and to access the chat room in a social network application through the network call client according to a second communication identifier, and the second communication identifier being a communication identifier corresponding to the network call client, wherein the network call client is a client application of the social network application and the call reservation terminal and the first call terminal are not friends in the in the social network application.

Another aspect of the present disclosure provides a network call method. The method includes receiving, by a first server, a reservation request transmitted by a call reservation terminal; generating, by the first server, a chat room identifier of a chat room in a social network application according to the reservation request, the chat room being used by at least two call terminals to perform a network call; generating, by the first server, a call reservation notification, the call reservation notification comprising an access link generated according to the chat room identifier; and transmitting, by the first server, the call reservation notification to the call reservation terminal, the call reservation notification being used for instructing the call reservation terminal to transmit the call reservation notification to a first call terminal according to a first communication identifier of the first call terminal. The at least two call terminals include the first call terminal, a communication client being installed in the first call terminal, the first communication identifier being a communication identifier corresponding to the communication client, the communication client being configured to invoke the network call client according to the access link, the network call client being configured to access the chat room according to a second communication identifier, and the second communication identifier being a communication identifier corresponding to the network call client, wherein the network call client is a client application of the social network application and the call reservation terminal and the first call terminal are not friends in the in the social network application.

Another aspect of the present disclosure provides a network call method. The method includes receiving, by a first call terminal through a communication client, a call reservation notification generated by a first server, the call reservation notification comprising an access link, the access link being generated by the first server according to a chat room identifier of a chat room in a social network application created by a second server, and the second server being configured to manage the created chat room; receiving, by the first call terminal, a trigger operation on the access link through the communication client; invoking, by the first call terminal, a network call client through the communication client according to the access link; transmitting, by the first call terminal, a call access request to the second server through the network call client, the call access request being used by the second server to establish a communications connection to the network call client in the chat room; and receiving, by the first call terminal, communication data from another call terminal in the chat room through the network call client and the second server.

Another aspect of the present disclosure provides a network call system, comprising a first server, a call terminal, and a call reservation terminal. The call reservation terminal is configured to transmit a reservation request to the first server; the first server is configured to: receive the reservation request transmitted by the call reservation terminal, the reservation request comprising a first communication identifier of a first call terminal, a communication client being installed in the first call terminal, and the first communication identifier being a communication identifier corresponding to the communication client; generate a chat room identifier of a chat room, the chat room being used by at least two call terminals to perform a network call, and the at least two call terminals comprising the first call terminal; generate a call reservation notification, the call reservation notification comprising an access link generated according to the chat room identifier; and transmit the call reservation notification to the first call terminal according to the first communication identifier, the call reservation notification being used for instructing the first call terminal to invoke a network call client through the communication client according to the access link, and access the chat room through the network call client according to a second communication identifier, and the second communication identifier being a communication identifier corresponding to the network call client; and the first call terminal is configured to: receive, through the communication client, the call reservation notification generated by the first server, the call reservation notification comprising the access link, the access link being generated by the first server according to the chat room identifier.

Details of one or more embodiments of this application are provided in the accompany drawings and descriptions below. Other features, objectives, and advantages of this application will become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figures 1, 2:
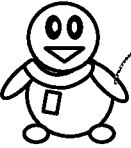
FIG. 1 is a schematic diagram of a call reservation page according to an embodiment.
FIG. 2 is a schematic diagram of a call reservation notification according to an embodiment.

To make the objectives, technical solutions, and advantages of this application clearer, the following further describes this application in detail with reference to the accompanying drawings and the embodiments. Understandably, the specific embodiments described herein are used only to describe this application, instead of limiting this application.

First, several terms involved in this application are introduced.

A chat room is used by at least two call terminals to perform a call by using a network communications technology.

The call terminal is a terminal used by a call party needing to perform a network call. The call terminal may be an electronic device having an Internet access function such as a mobile phone, a tablet computer, a wearable device, a portable laptop computer, a desktop computer, and a smart household device.

In one embodiment, the chat room may alternatively be referred to as a temporary discussion group, a discussion group, a group, or the like. This embodiment does not limit the name of the chat room.

In one embodiment, different call terminals may be geographically dispersed.

A call reservation terminal is configured to reserve a network call through a call reservation link provided by a first server. The first server is configured to trigger a second server to create a chat room. The second server is configured to create a chat room and manage the chat room.

The managing the chat room by the second server includes but is not limited to at least one of: adding a call terminal to the chat room, removing a call terminal from the chat room, and deleting the chat room.

In one embodiment, the first server may alternatively be referred as a conference reservation server. The second server may alternatively be referred as a network call server. This embodiment does not limit the names of the first server and the second server.

The call reservation terminal is a terminal used by a reservation maker of a network call. The call reservation terminal may be an electronic device having an Internet access function such as a mobile phone, a tablet computer, a wearable device, a portable laptop computer, a desktop computer, and a smart household device.

In one embodiment, the call reservation link is a uniform resource locator (URL) address provided by the first server.

In one embodiment, the call reservation link is entered a client by a user of the call reservation terminal. Alternatively, the client pre-stores the call reservation link.

The client may access the first server through the call reservation link. For example, the client is a browser, a social network client, or a shopping client.

When reserving a network call, the call reservation terminal obtains a call reservation page through the call reservation link, and generates a reservation request through a reservation operation performed on the call reservation page. The reservation request is used for reserving a chat room in the first server.

In one embodiment, the obtaining a call reservation page by the call reservation terminal through the call reservation link includes: generating, by the call reservation terminal, a reservation page request when the call reservation link is triggered; feeding back, by the first server, the call reservation page to the call reservation terminal according to the reservation page request; and receiving, by the call reservation terminal, the call reservation page.

In another embodiment, the obtaining a call reservation page by the call reservation terminal through the call reservation link includes: obtaining, by the call reservation terminal, a pre-stored call reservation page when the reservation link is triggered.

In one embodiment, that the call reservation link is triggered includes: a trigger operation on the reservation link is received; or a trigger instruction transmitted by the client for the reservation link is received.

In one example, the trigger operation on the call reservation link may be a click operation, a slide operation, a long press operation, and the like on the reservation link. The trigger instruction for the reservation link may be an instruction automatically generated by the client at startup. Alternatively, the trigger instruction for the reservation link may be an instruction generated by the client when the client receives a confirmation operation. For example, the client provides a confirmation option. The confirmation operation is an operation performed on the confirmation option. The confirmation operation is used for indicating that it is confirmed to obtain the call reservation page through the call reservation link.

Referring to FIG. 1, a call reservation link is http://tententhr.com. A call reservation page 110 obtained through the call reservation link is displayed in a browser of a call reservation terminal. A call reservation option 120 is displayed in the call reservation page 110. The call reservation terminal receives a reservation operation performed by a reservation maker on the call reservation option 120 in the call reservation page 110, and generates a reservation request according to the reservation operation.

In one embodiment, the reservation request includes a caller identity of the call terminal in the network call and a communication identifier of the call terminal.

The caller identity and the communication identifier are respectively described in the following.

First: A caller identity is an identity of a call party using a call terminal in a chat room.

In one embodiment, different call types of the network call may correspond to different caller identities in the network call. The caller identity in the network call includes but is not limited to the following types.

In a first scenario, the call type of the network call is an interview type. The caller identities include but are not limited to an interviewer and an interviewee.

In a second scenario, the call type of the network call is an inquiry type. The caller identities include but are not limited to: a doctor and a patient.

In a third scenario, the call type of the network call is a teaching type. The caller identities include but are not limited to: a teacher and a student.

In a fourth scenario, the call type of the network call is a legal consulting type. The caller identities include but are not limited to: a lawyer and a counselee.

In a fifth scenario, the call type of the network call is an enterprise type. The caller identities include but are not limited to: a leader and a staff member.

In some embodiments, the call type of the network call may alternatively be another type. Correspondingly, the caller identity may be changed according to the type of the network call. Caller identities are not listed in this embodiment herein.

In one embodiment, caller identities of call terminals in the network call may be the same. For example, caller identities of all call terminals in the network call may be students.

Second: A communication identifier is used by a first server to determine a manner of transmitting a call reservation notification to at least two call terminals.

In one embodiment, the communication identifier includes a first communication identifier corresponding to a communication client and/or a second communication identifier corresponding to a network call client.

In one embodiment, the communication client is a client that sends and receives emails, and correspondingly, the first communication identifier is an email address; and/or the communication client is a short message service (SMS) client, and correspondingly, the first communication identifier is a phone number; and/or the communication client is a social network client, and correspondingly, the first communication identifier is a social network account number. The social network client is different from the network call client.

In one embodiment, each call terminal has at least one first communication identifier. For example, a call terminal A has one communication identifier, and the communication identifier is a phone number. For another example, a call terminal B has two communication identifiers, and the two communication identifiers are a phone number and an email address.

In one embodiment, when the first communication identifier is an email address, the first server transmits an email to the email address. The email includes a call reservation notification. When the first communication identifier is a phone number, the first server transmits an SMS message to the phone number. The SMS message includes a call reservation notification. When the first communication identifier is a social network account number, the first server transmits an instant messaging (IM) message to the social network account number. The IM message includes a call reservation notification.

In one embodiment, the second communication identifier corresponding to the network call client is an identifier for logging in to the network call client. For example, the second communication identifier is a user account number, an identity card number, a phone number, or an email address.

In one embodiment, the reservation request further includes at least one type of the following information: a reservation time period of the network call, related information of a call party corresponding to the call terminal, a call purpose of the network call, and a convening form of the network call.

The reservation time period of the network call is used for indicating a time period between a start time of the network call and an end time of the network call. For example, the reservation time period of the network call is from 9:00 to 11:00 on Jul. 5, 2017.

In one embodiment, if two of call parties participating in the network call have different caller identities, related information of the two call parties is different.

In one example, if the network call includes a first call party whose caller identity is an interviewer and a second call party whose caller identity is an interviewee, related information of the first call party includes but is not limited to at least one of a name of the first call party and contact information of the first call party; and related information of the second call party includes but is not limited to at least one of a name of the second call party, an age of the second call party, a position the second call party is interviewed for, education experience of the second call party, work experience of the second call party, a birthdate of the second call party, contact information of the second call party, and strengths and personalities of the second call party.

In one example, if the network call includes a first call party whose caller identity is a doctor and a second call party whose caller identity is a patient, related information of the first call party includes but is not limited to at least one of a name of the first call party and contact information of the first call party; and related information of the second call party includes but is not limited to at least one of a name of the second call party, an age of the second call party, contact information of the second call party, and a medical history of the second call party.

In one example, if the network call includes a first call party whose caller identity is a teacher and a second call party whose caller identity is a student, related information of the first call party includes but is not limited to at least one of a name of the first call party, a teaching subject of the first call party, and contact information of the first call party; and related information of the second call party includes but is not limited to at least one of a name of the second call party, an education stage of the second call party, and contact information of the second call party.

In one example, if the network call includes a first call party whose caller identity is a lawyer and a second call party whose caller identity is a counselee, related information of the first call party includes but is not limited to at least one of a name of the first call party and contact information of the first call party; and related information of the second call party includes but is not limited to at least one of a name of the second call party, a consultation direction of the second call party, and contact information of the second call party.

In one example, if the network call includes a first call party whose caller identity is a leader and a second call party whose caller identity is a staff member, related information of the first call party includes but is not limited to at least one of a name of the first call party and contact information of the first call party; and related information of the second call party includes but is not limited to at least one of a name of the second call party and contact information of the second call party.

The convening form of the network call includes at least one of a video form, a voice form, and a text form.

Certainly, the reservation request may further include other content not listed in this embodiment.

In one embodiment, content (for example, an attendee identity and a communication identifier) included in the reservation request are determined according to content that is entered by the reservation maker and that is received in the call reservation page.

A communication client is used by a call terminal to receive a call reservation notification generated by a first server.

In one embodiment, the call reservation notification received by the communication client may be transmitted by the first server, or may be transmitted by the first server through the call reservation terminal.

In one example, when the first communication identifier of the call terminal is an email address, the communication client receives an email through an email transceiver client. The email includes the call reservation notification.

Referring to FIG. 2, an email 210 received by the communication client includes a call reservation notification 220.

In one example, when the first communication identifier of the call terminal is a phone number, the communication client receives an SMS message through an SMS client. The SMS message includes the call reservation notification.

Figure 3:
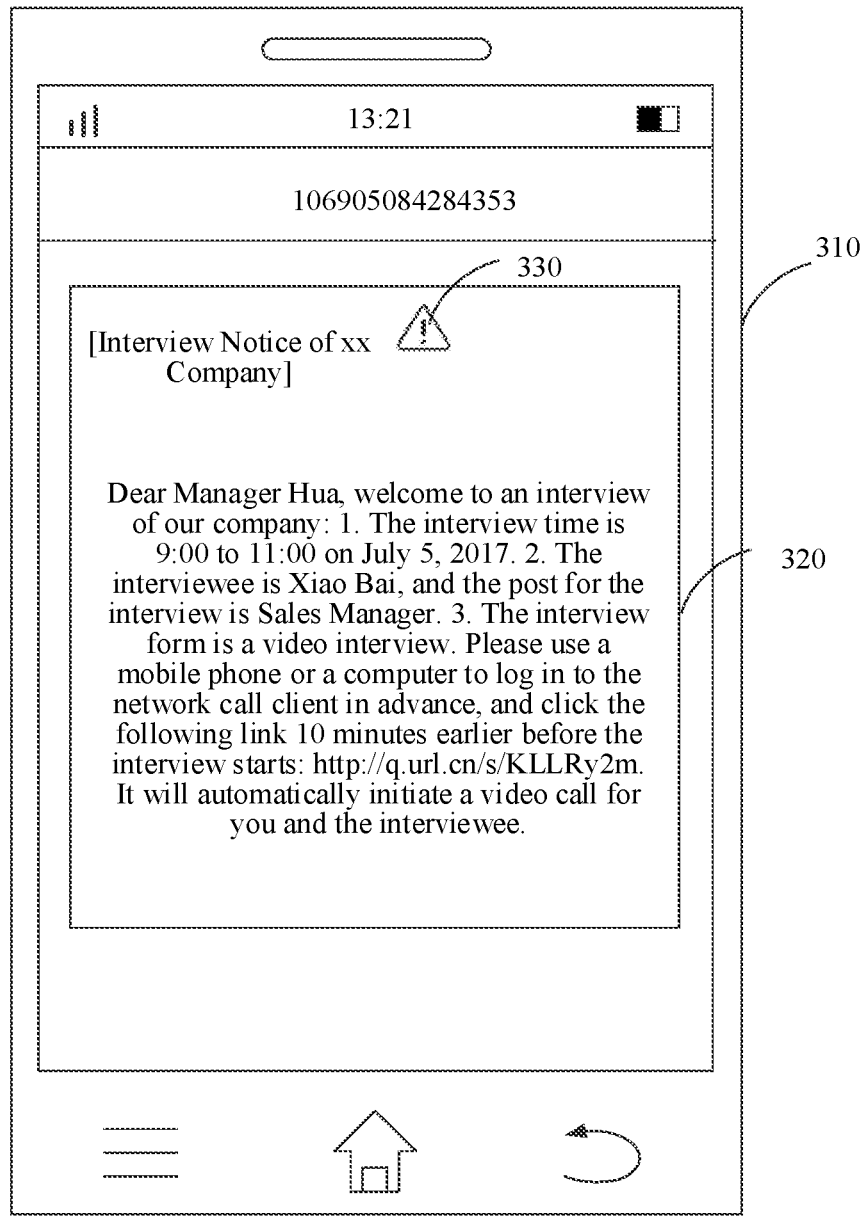
FIG. 3 is a schematic diagram of a call reservation notification according to an embodiment.

Referring to FIG. 3, an SMS message 310 received by the communication client includes a call reservation notification 320.

In one example, when the first communication identifier of the call terminal is a social network account number, the communication client receives an IM message through a social network client. The IM message includes the call reservation notification.

Figure 4:
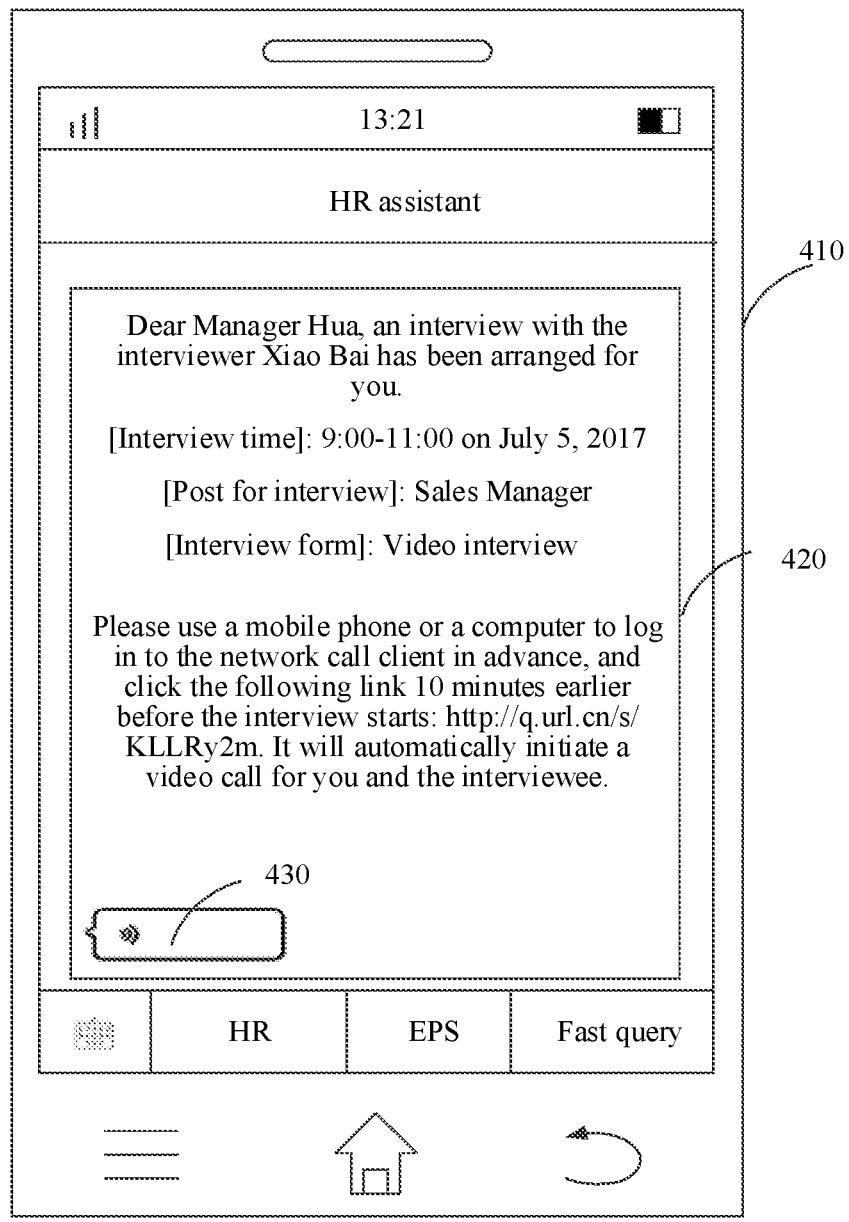
FIG. 4 is a schematic diagram of a call reservation notification according to an embodiment.

Referring to FIG. 4, an IM message 410 received by the communication client includes a call reservation notification 420.

A network call client is used by a call terminal to access a chat room created by a second server. The second server is configured to serve the network call client.

In one embodiment, the network call client is different from the communication client.

In one embodiment, a network call is usually performed by at least two call terminals. Therefore, the second server has a function of establishing a communications connection between the at least two call terminals.

Figure 5:
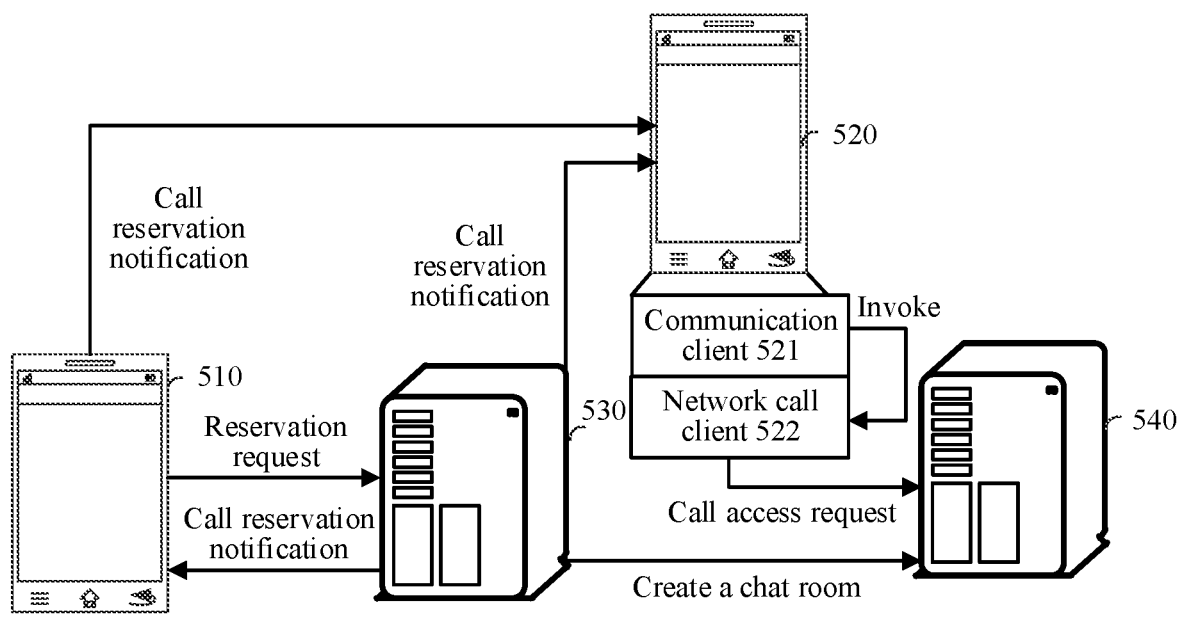
FIG. 5 is a schematic structural diagram of a network call system according to an embodiment.

FIG. 5 is a schematic structural diagram of a network call system according to an embodiment of this application. The system includes a call reservation terminal 510, at least one call terminal 520, a first server 530, and a second server 540.

The call reservation terminal 510 is configured to initiate a network call and generate a reservation request for the network call.

The call reservation terminal 510 is connected to the first server 530 through a wireless network or a wired network. The call reservation terminal 510 transmits the reservation request to the first server 530 through the wireless network or the wired network.

The first server 530 is connected to the second server 540 through a wireless network or a wired network. After receiving the reservation request, the first server 530 triggers, through the wireless network or the wired network, the second server 540 to create a chat room.

The second server 540 transmits a chat room identifier of the created chat room to the first server 530. The first server 530 generates an access link according to the chat room identifier, and then generates a call reservation notification according to the access link.

In one embodiment, the chat room identifier is a unique character string allocated to the chat room by the second server 540. The chat room identifier includes at least one of a number, a letter, and a symbol.

In one embodiment, the chat room identifier may alternatively be a chat room signature or a discussion group signature. This embodiment does not limit the name of the chat room identifier.

In one embodiment, the reservation request includes a reservation time period of the network call. An effective time period of the chat room created by the second server 540 is determined according to the reservation time period.

In one embodiment, the chat room created by the second server 540 may be reused. In this case, after the first server 530 receives the reservation request, the second server 540 may transmit a chat room identifier of a created chat room in an idle state to the first server 530 instead of creating a chat room. In this scenario, to ensure that the second server 540 can determine a quantity of times that the chat room has been used, the chat room identifier includes a first character string used for indicating the quantity of use times and a second character string used for indicating the chat room.

The second server 540 is connected to the at least one call terminal 520 through a wireless network or a wired network. The first server 530 is connected to the at least one call terminal 520 through a wireless network or a wired network.

In one embodiment, the first server 530 transmits the call reservation notification to the at least one call terminal 520. Alternatively, the first server 530 transmits the call reservation notification to the call reservation terminal 510, and the call reservation terminal 510 transmits the call reservation notification to the at least one call terminal 520.

In one embodiment, a communication client 521 and a network call client 522 are installed in the call terminal 520. Alternatively, the network call client 522 is installed in the call terminal 520.

The call terminal 520 receives and displays the call reservation notification through the communication client 521, receives a trigger operation on the access link in the call reservation notification, and invokes the network call client 522 according to the trigger operation.

In one embodiment, when the network call client 522 has a function of receiving a call reservation notification, the call terminal 520 may receive and display the call reservation notification through the network call client 522, and receives a trigger operation on the access link in the call reservation notification.

When the network call client 522 is invoked to run in the foreground, the network call client 522 transmits a chat room access request to the second server 540. The chat room access request includes the chat room identifier indicated by the access link. The second server 540 adds the network call client 522 into the chat room according to the chat room identifier, and sends back an acknowledgement response to the network call client 522 in response to successful addition. After receiving the acknowledgement response, the network call client 522 transmits a call access request to the second server 540. The second server 540 establishes a communications connection to the network call client 522 according to the call access request, and receives, through the communications connection, communication data obtained by the network call client 522; and/or transmits, to the network call client 522 through the communications connection, communication data that is transmitted to the second server 540 by another network call client in the chat room.

The communication data includes at least one of video data, voice data, text data, and file data.

In one embodiment, in the network call, different call terminals 520 may have different caller identities. The call terminals 520 having different identities may have different displayed names in the network call. Therefore, after invoking the network call client 522, the call terminal 520 further needs to feed back a caller identity and a second communication identifier of the network call client 522 to the first server 530 through the network call client 522. In this way, the first server 530 may bind the caller identity with the second communication identifier to obtain a first correspondence; and transmit the caller identity corresponding to the second communication identifier to another network call client 522 according to the first correspondence when the another network call client 522 joins the chat room, so that the another network call client 522 may determine a displayed name corresponding to the second communication identifier according to the caller identity.

In one embodiment, the caller identity is represented by using an identity identifier. The identity identifier may be represented by using at least one of a number, a letter, and a symbol. In one example, 1 represents a caller identity of an interviewer, and 2 represents a caller identity of an interviewee.

In one embodiment, the call reservation terminal 510 may alternatively be a call terminal 520 in this embodiment.

In one embodiment, a standard communications technology and/or protocol is used for the wireless network or the wired network. The network is usually the Internet, but may alternatively be any other network, including but not limited to a local area network (LAN), a metropolitan area network (MAN), a wide area network (WAN), a mobile, wired, or wireless network, a private network or a virtual private network, or any combination thereof). In some embodiments, data exchanged through the network may be represented by using a technology and/or format such as the HyperText Mark-up Language (HTML) and the Extensible Markup Language (XML). In addition, all or some links may be encrypted by using Secure Socket Layer (SSL), Transport Layer Security (TLS), Virtual Private Network (VPN), Internet Protocol Security (IPsec), or other common encryption technologies. In other embodiments, custom and/or dedicated data communications technologies may also be used in place of or in addition to the foregoing data communications technologies.

Figure 6A:
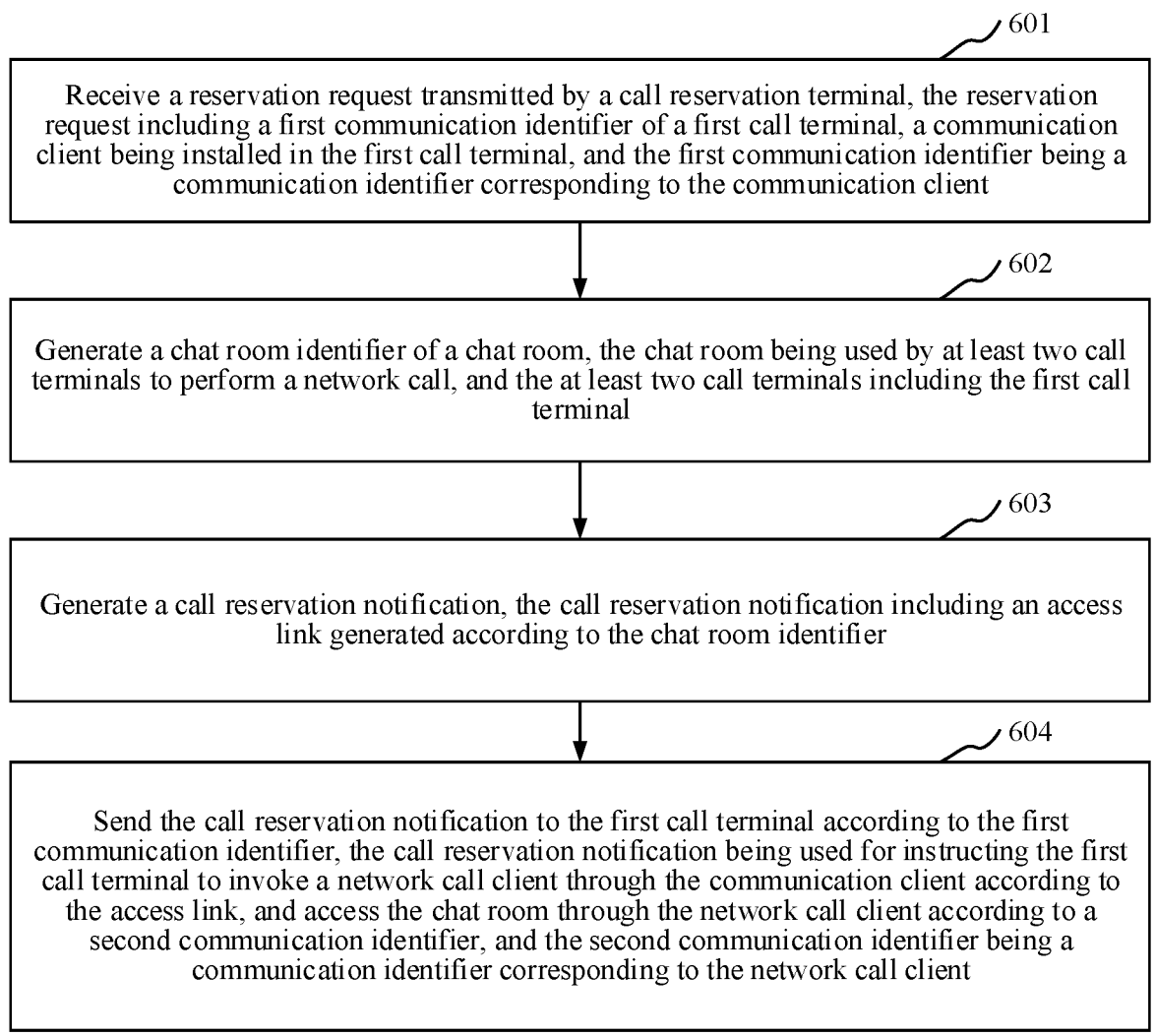
FIG. 6A is a flowchart of a network call method according to an embodiment.

FIG. 6A is a flowchart of a network call method according to an embodiment of this application. The network call method is applied to the network call system shown in FIG. 5. The method may include the following steps:

Step 601. A first server receives a reservation request transmitted by a call reservation terminal, the reservation request including a first communication identifier of a first call terminal, a communication client being installed in the first call terminal, and the first communication identifier being a communication identifier corresponding to the communication client.

When needing to initiate a network call, the call reservation terminal obtains a call reservation page through a call reservation link, generates the reservation request through a reservation operation performed on the call reservation page, and transmits the reservation request to the first server. Correspondingly, the first server receives the reservation request transmitted by the call reservation terminal.

In one embodiment, the reservation request is a HyperText Transfer Protocol (HTTP) request.

In one embodiment, the call reservation terminal registers a login account number in the first server in advance and sets a login password corresponding to the login account number. A correspondence between the login account number and the login password is stored in the first server. The login account number and the login password are used by the call reservation terminal to log in to the first server.

In one embodiment, before obtaining the call reservation page through the call reservation link, the call reservation terminal logs in to the first server by using the login account number and the login password. The first server verifies whether the login account number is stored and whether the login account number matches the login password. After the verification succeeds, the first server transmits a login success response to the call reservation terminal, and transmits the call reservation page to the call reservation terminal.

In one embodiment, the login account number is a second communication identifier of a network call client used by a user corresponding to the call reservation terminal. Correspondingly, the login password is a login password corresponding to the communication identifier.

In one embodiment, the call reservation terminal obtains permission to access the first server in advance. The first server stores a permission identifier allocated to the call reservation terminal. The permission identifier is used for indicating that the call reservation terminal has permission to access the first server. In one embodiment, the permission identifier may include at least one of a number, a letter, and a symbol. In this scenario, before the call reservation terminal obtains the call reservation page through the call reservation link, the call reservation terminal transmits the permission identifier to the first server. The first server detects whether the permission identifier is stored. If so, the first server transmits a permission verification success response to the call reservation terminal and transmits the call reservation page to the call reservation terminal.

In one embodiment, the call reservation terminal simultaneously transmits the permission identifier and the login account number and the login password to the first server. When generating the login success response and the permission verification success response, the first server transmits the call reservation page to the call reservation terminal.

In one embodiment, when receiving the permission verification success response, the call reservation terminal transmits the login account number and the login password to the first server. When generating the login success response, the first server transmits the call reservation page to the call reservation terminal.

In one embodiment, the call reservation terminal may reserve calls with call terminals, including a first call terminal and/or a second call terminal.

In one embodiment, the reservation request includes a first communication identifier of the first call terminal. The communication client and the network call client are installed in the first call terminal. The communication client is different from the network call client.

In one embodiment, the reservation request further includes a second communication identifier of a second call terminal. The network call client is installed in the second call terminal.

Step 602. The first server generates a chat room identifier of a chat room, the chat room being used by at least two call terminals to perform a network call, and the at least two call terminals including the first call terminal.

The chat room is used by n call terminals to perform a network call. A second server is configured to manage the created chat room.

Figure 7:
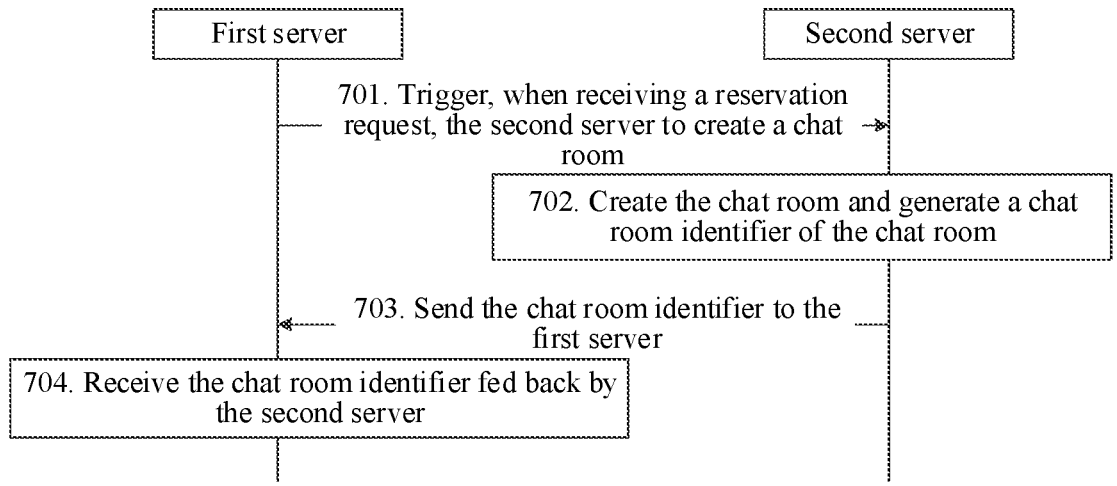
FIG. 7 is a flowchart of a chat room identifier obtaining method according to an embodiment.

In this embodiment, the manner of generating a chat room identifier of a chat room by the first server includes but is not limited to the following manners:

Referring to FIG. 7, in a first manner, the generating a chat room identifier of a chat room by the first server includes the following steps:

Step 701. The first server triggers, when receiving the reservation request, a second server to create the chat room.

The triggering, by the first server, a second server to create the chat room includes: transmitting, by the first server, a chat room creation request to the second server. The chat room creation request is used for triggering the second server to create the chat room.

The chat room creation request carries the second communication identifier of the network call client in the call reservation terminal.

In one embodiment, the second communication identifier carried in the chat room creation request is determined by the first server according to a correspondence between the login account number and the second communication identifier. Alternatively, the second communication identifier carried in the chat room creation request is the login account number.

Step 702. The second server creates the chat room and generates the chat room identifier of the chat room.

The second server creates the chat room according to the second communication identifier carried in the chat room creation request.

When triggering the second server to create the chat room, the first server transmits a reservation time period of the network call to the second server. An effective time period of the chat room created by the second server is determined according to the reservation time period of the network call. Usually, the effective time period of the chat room is greater than the reservation time period of the network call.

In one embodiment, a start time of the effective time period is earlier than a start time of the reservation time period, and duration between the start time of the effective time period and the start time of the reservation time period is first duration; and/or an end time of the effective time period is later than an end time of the reservation time period, and duration between the end time of the effective time period and the end time of the reservation time period is second duration. The first duration may or may not be equal to the second duration, which is not limited in this embodiment.

In one embodiment, after successfully creating the chat room, the second server feeds back a creation success response to the call reservation terminal, and sends back room information of the chat room to the call reservation terminal.

In one embodiment, the call reservation terminal modifies the chat room information transmitted by the second server, and transmits the modified chat room information to the second server.

In one embodiment, after receiving the modified chat room information, or when receiving no modified chat room information in preset duration, or after receiving a reservation confirmation notification transmitted by the call reservation terminal, the second server deletes the second communication identifier of the network call client in the call reservation terminal from the chat room. In this case, the chat room is empty.

The reservation confirmation notification is used for indicating that the call reservation terminal confirms that the network call is convened by using the chat room created by the second server.

In one embodiment, the chat room information includes but is not limited to at least one of a name of the chat room, a quantity of call parties in the chat room, and a conference parameter.

In one embodiment, the manner of generating the chat room identifier by the second server includes but is not limited to at least one of random generation by using a random algorithm, generation according to a creation date, and generation according to a creation sequence.

Step 703. The second server transmits the chat room identifier to the first server.

Step 704. The first server receives the chat room identifier fed back by the second server.

The chat room identifier received by the first server is the chat room identifier generated by the first server.

Figure 8:
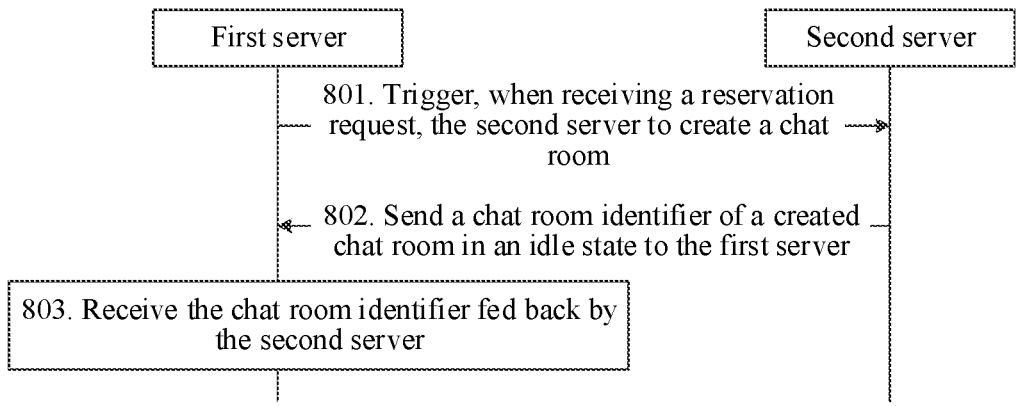
FIG. 8 is a flowchart of a chat room identifier obtaining method according to another embodiment.

Referring to FIG. 8, in a second manner, the generating a chat room identifier of a chat room by the first server includes the following steps:

Step 801. The first server triggers, when receiving the reservation request, a second server to create the chat room.

For details of a related description of this step, reference is made to step 701, and the details are not described herein again.

Step 802. The second server transmits a chat room identifier of a created chat room in an idle state to the first server.

The chat room in an idle state is a chat room without any call terminal.

In one embodiment, after other call terminals end a network call in the chat room, the second server may not delete the chat room. In this case, the chat room may be allocated to other call terminals for use to save resources consumed by the second server to create a chat room.

In one embodiment, an effective time period of the chat room is determined according to a reservation time period of a network call. When the network call ends in the effective time period of the chat room, communications connections between all call terminals and the chat room are broken, and the chat room is in an idle state. In one embodiment, if the first server triggers the second server to create a chat room, the second server modifies the effective time period of the chat room according to a reservation time period of a next network call, and transmits a chat room identifier of the chat room to the first server. When triggering the second server to create the chat room, the first server transmits the reservation time period of the network call to the second server.

Step 803. The first server receives the chat room identifier fed back by the second server.

The chat room identifier received by the first server is the chat room identifier generated by the first server.

Step 603. The first server generates a call reservation notification, the call reservation notification including an access link generated according to the chat room identifier.

The call reservation notification includes the access link that is generated by the first server according to the chat room identifier. The access link is used by at least one of the n call terminals to access the chat room.

In one embodiment, the reservation request includes caller identities of the at least two call terminals. The at least two call terminal includes the first call terminal.

The generating a call reservation notification by the first server includes: generating the access link according to the chat room identifier and the caller identity and generating the call reservation notification according to the access link.

The generating, by the first server, the call reservation notification according to the access link includes: adding the access link into a preset notification template to generate the call reservation notification.

The notification template is used for indicating public information in each call reservation notification. For example, the notification template corresponding to the call reservation notification shown in FIG. 3 is:

[Interview Notice of xxxx]

Dear xx, Welcome to an interview of our company. 1. The interview time is xxxx. 2. The interviewer is xx and the position considered for the interview is xx. 3. The interview format is xxxx. Please use a mobile phone or a computer to log in to the network call client in advance, and click the following link 10 minutes earlier before the interview starts: xxx. It will automatically initiate a video call for you and the interviewee.

In one embodiment, different first communication identifiers correspond to different notification templates. In one embodiment, different caller identities correspond to different notification templates.

In one embodiment, the call reservation notification further includes at least one of a caller identity in the reservation request, a reservation time period of the network call, related information of a call party corresponding to the call terminal, a call purpose of the network call, and a convening form of the network call.

In one embodiment, the caller identity corresponding to the network call includes a first caller identity and a second caller identity, and the first caller identity is different from the second caller identity. In this case, the generating, by the first server, the access link according to the chat room identifier and the caller identity includes: generating a first access link according to the chat room identifier and the first caller identity of the first call terminal, the first access link being used by the first call terminal to access the chat room as the first caller identity; or generating a second access link according to the chat room identifier and the second caller identity of the first call terminal, the second access link being used by the first call terminal to access the chat room as the second caller identity, and the second access link being different from the first access link.

In one example, if the first call terminal needs to access the chat room as a caller identity of an interviewer, the first access link generated by the first server according to a chat room identifier 100 of the chat room and an identity identifier 1 of the interviewer is: https://q.url.cn/s/1001.

In one example, if the first call terminal needs to access the chat room as a caller identity of an interviewee, the second access link generated by the first server according to the chat room identifier 100 of the chat room and an identity identifier 0 of the interviewee is: https://q.url.cn/s/1000.

In one embodiment, the access link is a short link. The short link is a short network address obtained after a long link is converted by using a preset algorithm. In this way, resources consumed by the first server to transmit the call reservation notification to each call terminal can be reduced. In this case, the first server stores a correspondence between the short link and the long link. The correspondence may be a one-to-one mapping relationship between the short link and the long link. Alternatively, the correspondence may be the conversion algorithm between the short link and the long link.

Step 604. The first server transmits the call reservation notification to the first call terminal according to the first communication identifier, the call reservation notification being used for instructing the first call terminal to invoke a network call client through the communication client according to the access link, and access the chat room through the network call client according to a second communication identifier, and the second communication identifier being a communication identifier corresponding to the network call client.

The call reservation notification is used for instructing at least one call terminal to access the chat room.

For example, the communication identifier of the first call terminal is an email address. The first server transmits the call reservation notification to the first call terminal according to the email address of the first call terminal. An email transceiver client in the first call terminal receives the call reservation notification.

For another example, the communication identifier of the first call terminal is a phone number. The first server transmits the call reservation notification to the first call terminal according to the phone number of the first call terminal. An SMS client in the first call terminal receives the call reservation notification.

For another example, the communication identifier of the first call terminal is a social network account number. The first server transmits the call reservation notification to the first call terminal according to the social network account number of the first call terminal. A social network client in the first call terminal receives the call reservation notification.

Figure 6B:
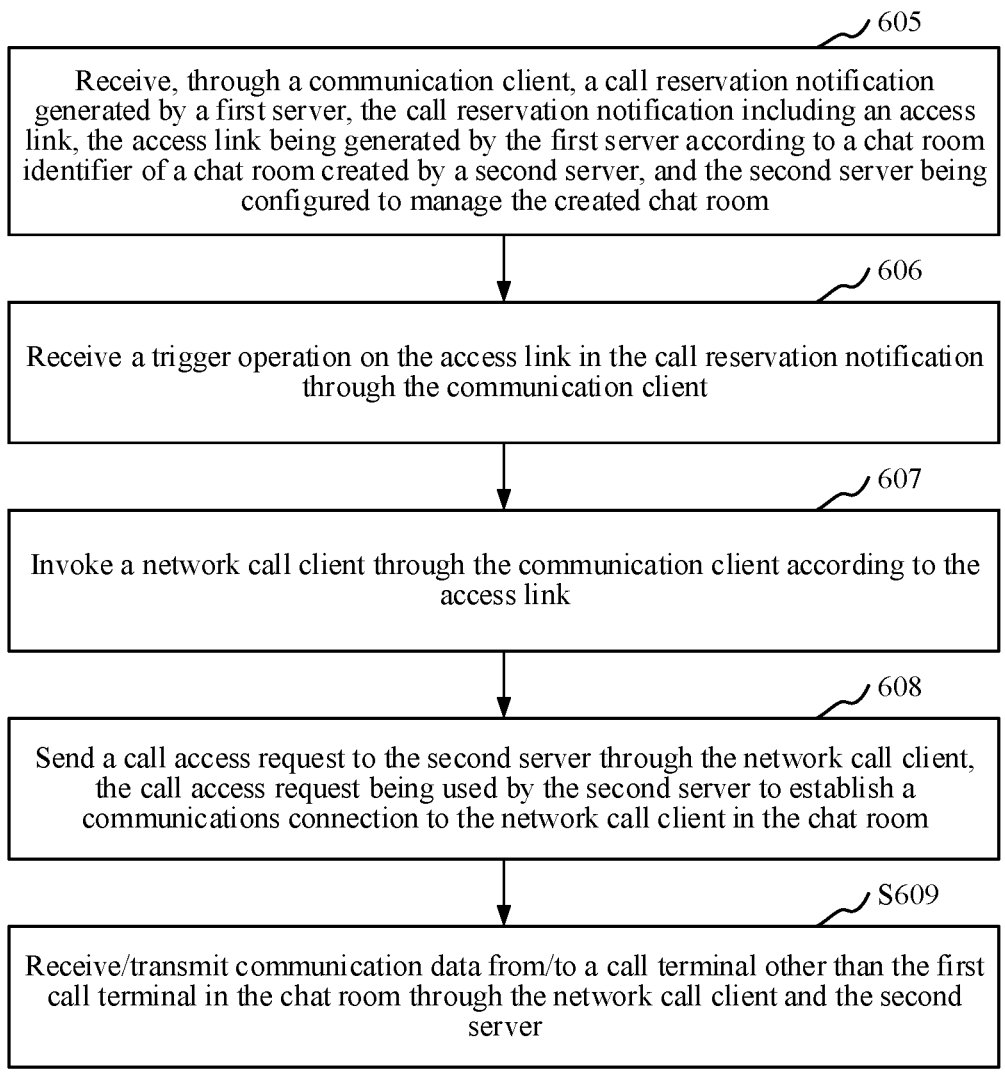
FIG. 6B is a flowchart of a network call method according to an embodiment.

FIG. 6B is a flowchart of a network call method according to an embodiment of this application. The network call method is applied to the network call system shown in FIG. 5, and the method may include the following steps:

Step 605. A first call terminal receives, through a communication client, a call reservation notification generated by a first server, the call reservation notification including an access link, the access link being generated by the first server according to a chat room identifier of a chat room created by a second server, and the second server being configured to manage the created chat room.

The call reservation notification includes an access link.

In one embodiment, after receiving the call reservation notification, the communication client displays the call reservation notification.

In one embodiment, after receiving the call reservation notification, the communication client creates a conference reminder. The conference reminder is used for reminding a call party to access the chat room before a start time of a reservation time period of a network call.

Figure 9A:
FIG. 9A is a schematic diagram of a call reminder according to an embodiment.

Referring to FIG. 9A, assuming that the communication client is an email transceiver client, a conference reminder 900 is created in a calendar of the email transceiver client after the call reservation notification is received. The conference reminder may remind the call party to access the chat room before the network call.

Step 606. The first call terminal receives a trigger operation on the access link in the call reservation notification through the communication client.

The trigger operation includes but is not limited to an operation of clicking the access link, an operation of long pressing the access link, and an operation of sliding the access link.

Step 607. The first call terminal invokes a network call client through the communication client according to the access link.

Figure 9B:
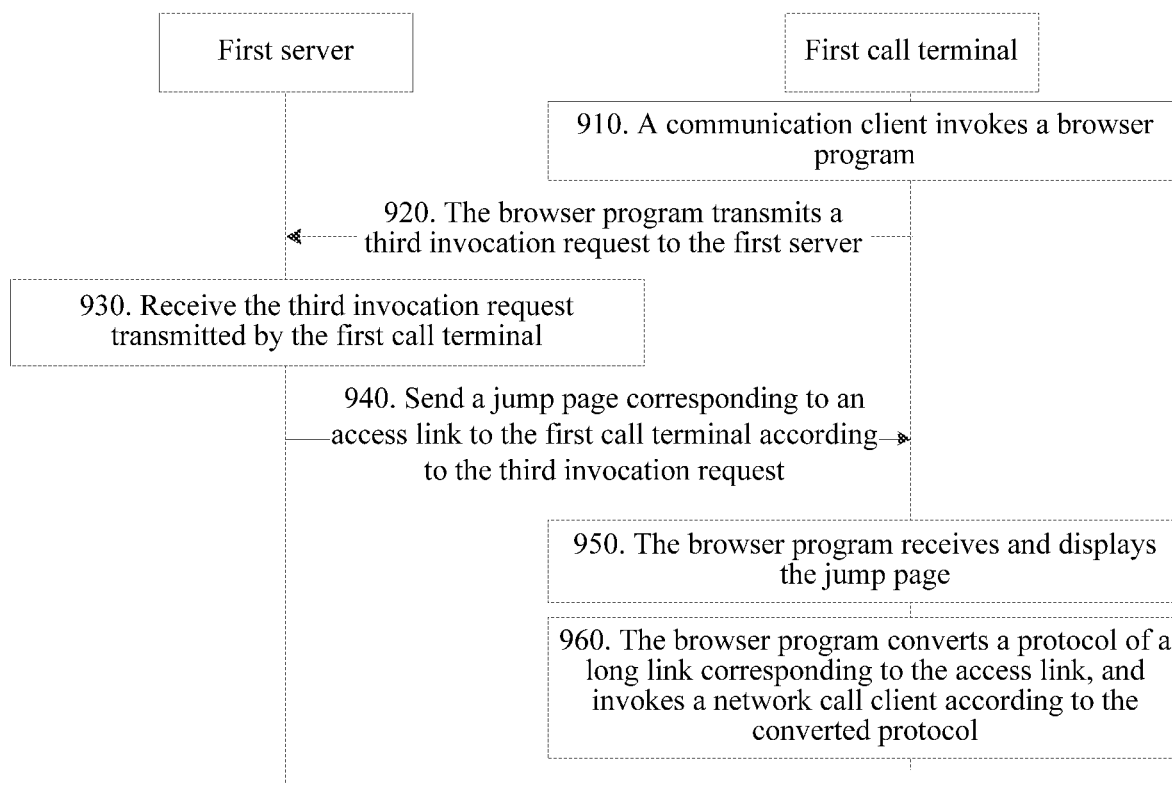
FIG. 9B is a flowchart of invoking a network call client according to an embodiment.

In one embodiment, referring to FIG. 9B, the invoking, by the first call terminal, a network call client through the communication client according to the access link includes the following steps:

Step 910. The first call terminal invokes a browser program through the communication client.

The communication client invokes the browser program according to a protocol (HTTP protocol) of the access link. The browser program may be a program built in the communication client and configured to access a web page. Alternatively, the browser program may be a client independent from the communication client and configured to access a web page.

Step 920. The browser program in the first call terminal transmits a third invocation request to the first server.

The third invocation request includes the access link. The third invocation request is used for triggering the first server to transmit a jump page corresponding to the access link. The jump page is used for prompting that the network call client is being invoked.

Step 930. The first server receives the third invocation request transmitted by the first call terminal.

Step 940. The first server transmits the jump page corresponding to the access link to the first call terminal according to the third invocation request.

In one embodiment, when the access link is a short link, the first server determines a corresponding long link according to the short link, and transmits a jump page corresponding to the long link and the long link to the first call terminal.

Step 950. The browser program in the first call terminal receives and displays the jump page.

In one embodiment, the jump page includes a download address of the network call client. When the network call client is not installed in the first call terminal, the browser program receives a trigger operation performed on the download address, downloads the network call client according to the download address, and invokes the network call client. Alternatively, when display duration of the jump page reaches preset duration, the browser program downloads the network call client according to the download address and invokes the network call client.

Figure 9C:
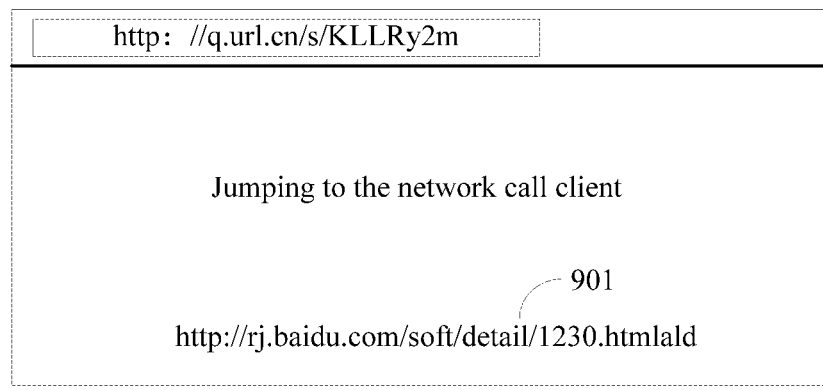
FIG. 9C is a schematic diagram of a jump page according to an embodiment.

Referring to a jump page shown in FIG. 9C, the jump page includes a download address 901 of the network call client.

Step 960. The browser program in the first call terminal converts a protocol of a long link corresponding to the access link and invokes the network call client according to the converted protocol.

The browser program invokes the network call client according to the converted protocol and transmits a caller identity and/or a chat room identifier indicated by the access link to the network call client.

The caller identity indicated by the access link is determined by using an identity identifier in the long link; and/or the chat room identifier indicated by the access link is determined by using the chat room identifier in the long link.

The converted protocol is determined according to a client identifier of the network call client. The client identifier may be at least one of a packet name of the network call client, a version of the network call client, and a type of the network call client, which is not limited in this embodiment.

For example, the client identifier of the network call client is qi. The protocol before conversion is a protocol starting with http://, and the converted protocol is a protocol starting with mqqconferenceflyticket://.

In another example, the client identifier of the network call client is Tencent. The protocol before conversion is a protocol starting with http://, and the converted protocol is a protocol starting with tencent://.

In one embodiment, after successfully invoking the network call client (that is, after the network call client is run in foreground), the browser program closes the jump page, or stops running.

Step 608. The first call terminal transmits a call access request to the second server through the network call client, the call access request being used by the second server to establish a communications connection to the network call client in the chat room.

The call access request is used by the second server to establish a communications connection to the network call client in the chat room.

In this embodiment, after the network call client is invoked to run in the foreground, the call access request is directly transmitted to the second server, so that the second server establishes the communications connection between the network call client and chat room. A call party does not need to manually trigger the network call client to generate the call access request, thereby improving the efficiency that the call terminal accesses the network call.

In one embodiment, the communications connection between the chat room and the network call client may be at least one of a video connection, a voice connection, a text connection, and a document connection.

Step 609. The first call terminal receives/transmits communication data from/to a call terminal other than the first call terminal in the chat room through the network call client and the second server.

The communication data includes data transmitted by another network call client participating in the network call to the second server, and/or data obtained by the network call client.

The receiving/transmitting, by the network call client in the call terminal, communication data from/to another network call client in the chat room through the second server includes: transmitting, by the call terminal, communication data obtained by the network call client to the second server through the communications connection to the second server; and/or receiving, by the call terminal through the communications connection to the second server, communication data that is collected by another network call client and that is transmitted by the second server.

Figure 6C:
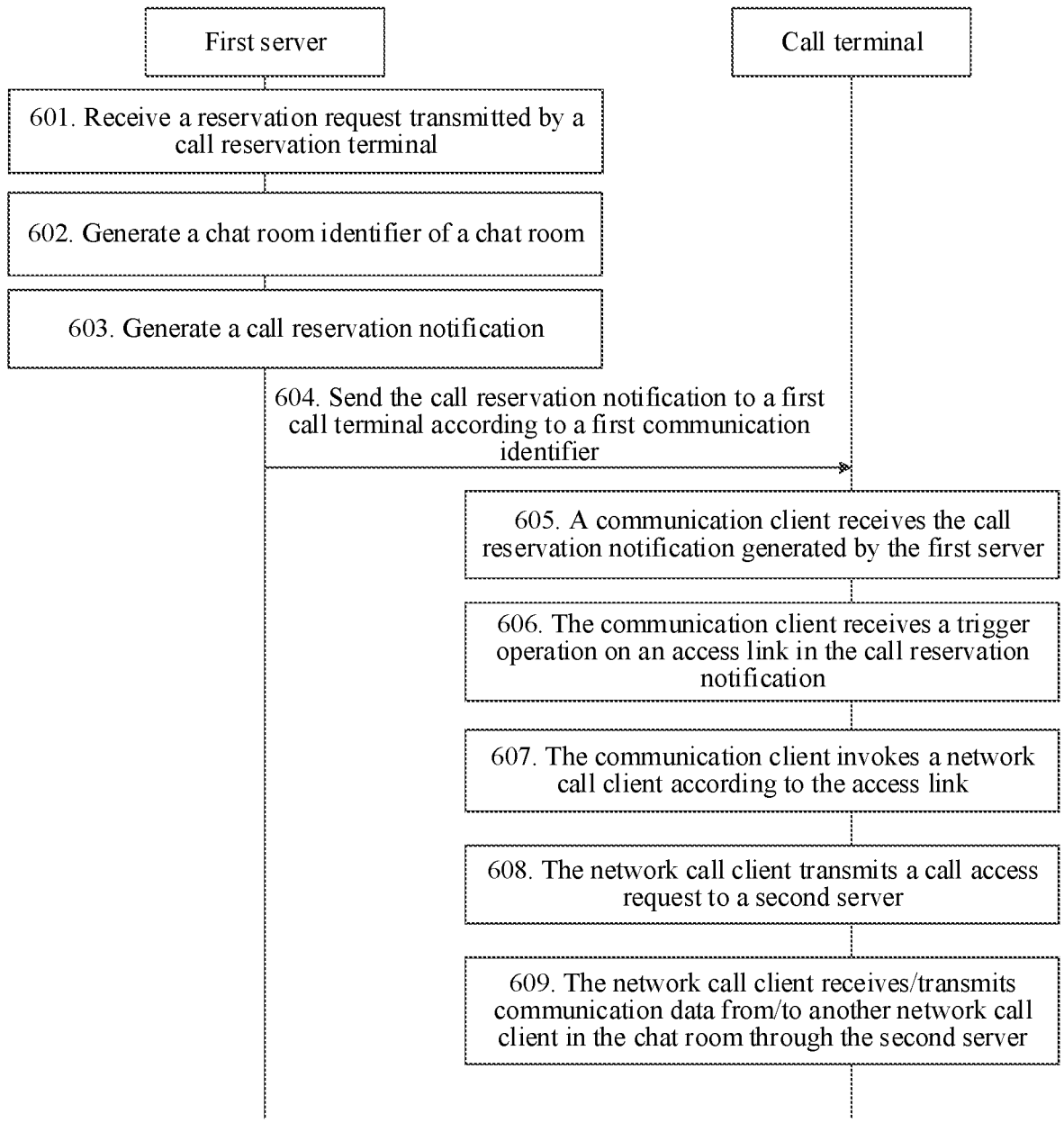
FIG. 6C is a flowchart of a network call method according to another embodiment.

FIG. 6C is a flowchart of a network call method according to an embodiment of this application. The network call method is applied to the network call system shown in FIG. 5. The method may include step 601 to step 609 above.

Based on the foregoing, according to the network call method provided in the embodiments, the call reservation terminal transmits the reservation request to the first server, and the first server generates the call reservation notification and transmits the call reservation notification to the at least one call terminal, the call reservation notification including the access link of the chat room created by the second server, so that the call terminal receiving the access link can access the chat room. A problem that a call terminal possibly cannot access the chat room because only a call terminal has a friend relationship with the call reservation terminal can access the chat room is resolved. Each call terminal can access the chat room according to the access link without establishing a friend relationship with the call reservation terminal in advance. Therefore, a requirement that each call reservation terminal can access the chat room is met.

In the present disclosure, a call terminal being a friend or has a friend relationship with another call terminal refers to the fact that the two call terminals, through a client application such as a social network application, identify each other as a friend or contact. In one example, a first call terminal, through a social network application, may add a second terminal as its friend, and send an invitation to the second terminal to add itself as a friend. The second terminal may receive the invitation from the first terminal and add the first terminal as its friend. In some embodiments of the present disclosure, two call terminals being friends may refer to any previous identifications of each other by the call terminals, such as a first terminal being on a contact list of the second terminal, or vise versa. In the present disclosure, when two call terminals are not friends, in some embodiments, the two call terminals have not previously identified each other. For example, a call reservation terminal has not identified the call terminal as its contact or friend in a social network application.

In the present disclosure, a network call client 522 may be a social network client application that may host a call between a number of the social network users. The social network client may host a chat room to facilitate a call among the social network users. In some embodiments, only the social network users who are friends, or identified each other in the social network application can join a call in the chat room.

In addition, a reservation maker of a network call usually does not need to participate in the network call. Therefore, after the second server creates the chat room according to the second communication identifier in the call reservation terminal, the second communication identifier is automatically deleted from the chat room, so that the call reservation terminal does not need to receive an exit operation that is performed by the reservation maker of the network call to exit the chat room, or transmit an exit request to the second server, thereby reducing resources consumed by the call reservation terminal, and reducing transmission resources between the call reservation terminal and the second server.

In one embodiment, steps 601-604, 701, 704, 801, 803, 930, and 940 may be independently implemented as a method embodiment at a side of the first server. Steps 605-609, 910, 920, 950, and 960 may be independently implemented as a method embodiment at a side of the call terminal. Steps 702, 703, and 802 may be independently implemented as a method embodiment at a side of the second server, which is not limited in this embodiment.

In one embodiment, the communication client may invoke the browser program in background. The browser program invokes the network call client in the background.

In this case, the browser program does not need to request the jump page from the first server or display the jump page.

In one embodiment, to avoid the case that the call party using the first call terminal transmits the access link to another user and consequently the another user joins the chat room and obtains content of the network call, the call reservation notification further includes an information confidentiality warn. The information confidentiality warn is used for warning the call party not to leak the access link in the call reservation notification.

In one embodiment, the information confidentiality warn may be in at least one of a text form, a picture form, a video form, and a voice form.

For example, referring to the call reservation notification 220 shown in FIG. 2, the call reservation notification 220 includes an information confidentiality warn in a text form "Please do not leak this notice to others".

For another example, referring to the call reservation notification 320 shown in FIG. 3, the call reservation notification 320 includes an information confidentiality warn 330 in a picture form.

For another example, referring to the call reservation notification 420 shown in FIG. 4, the call reservation notification 420 includes an information confidentiality warn 430 in a voice form.

In one embodiment, the call reservation notification may alternatively be transmitted separately from the information confidentiality warn. For example, the first server first transmits the call reservation notification to the first call terminal, and then transmits the information confidentiality warn to the first call terminal.

In one embodiment, in the foregoing embodiments, if the at least two call terminals further include the second call terminal, after step 603, the first server transmits the call reservation notification to the network call client of the second call terminal according to the second communication identifier of the second call terminal.

The network call client in the second call terminal receives a trigger operation on the access link in the call reservation notification (refer to step 606 for details of a related description), transmits a call access request to the second server (refer to step 608 for details of a related description), and receives/transmits communication data from/to another network call client in the chat room through the second server.

In one embodiment, in the foregoing embodiments, the first server may transmit the call reservation notification to the at least one call terminal through the call reservation terminal. In this case, the call reservation notification does not need to carry communication identifiers of the at least two call terminals.

Figure 6D:
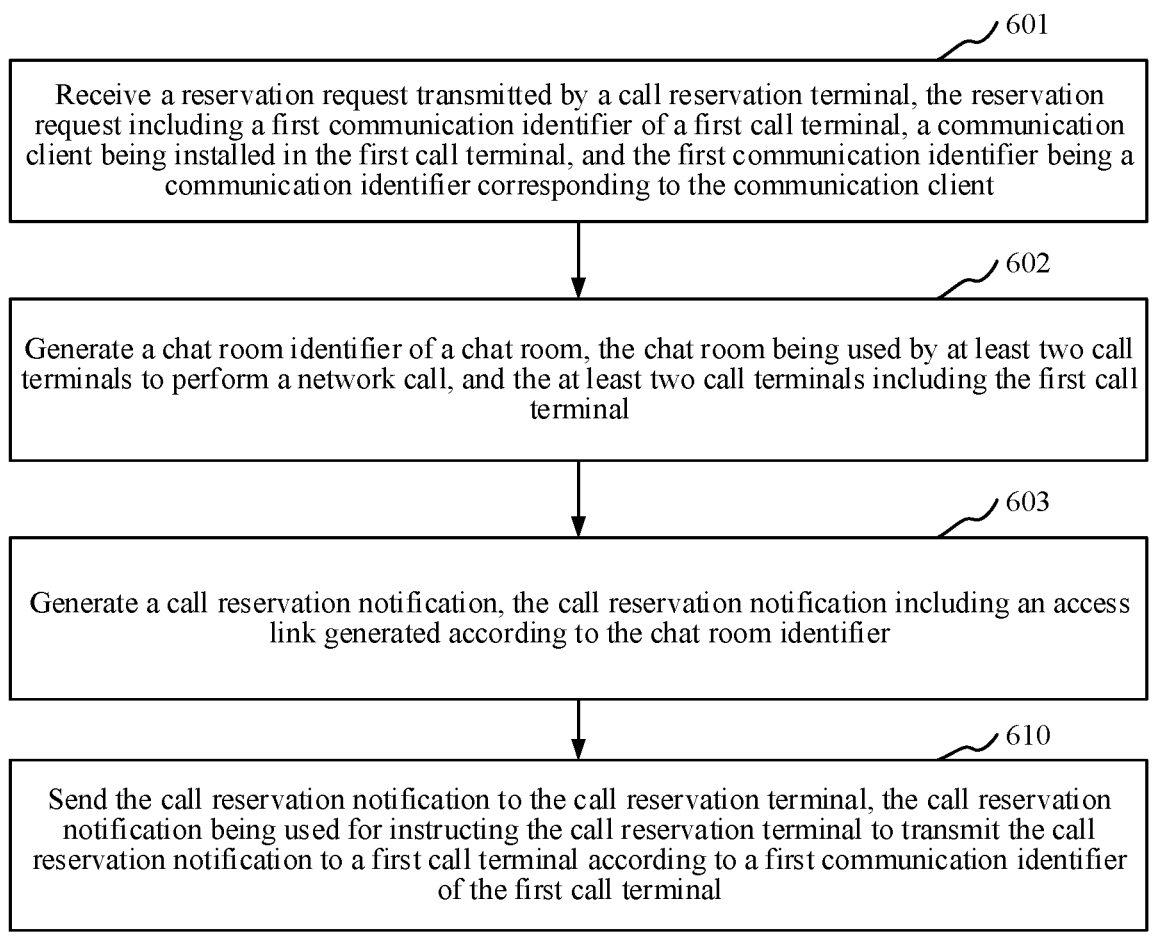
FIG. 6D is a flowchart of a network call method according to another embodiment.

FIG. 6D is a flowchart of a network call method according to an embodiment of this application. The network call method is applied to the network call system shown in FIG. 5. Based on the embodiment shown in FIG. 6A, the method may include the following step as an alternative step of step 604.

Step 610. The first server transmits the call reservation notification to the call reservation terminal, the call reservation notification being used for instructing the call reservation terminal to transmit the call reservation notification to a first call terminal according to a first communication identifier of the first call terminal.

The at least two call terminals include the first call terminal. A communication client is installed in the first call terminal. The first communication identifier is a communication identifier corresponding to the communication client.

The communication client is configured to invoke a network call client according to an access link. The network call client is configured to access a chat room according to a second communication identifier. The second communication identifier is a communication identifier corresponding to the network call client.

Figure 6E:
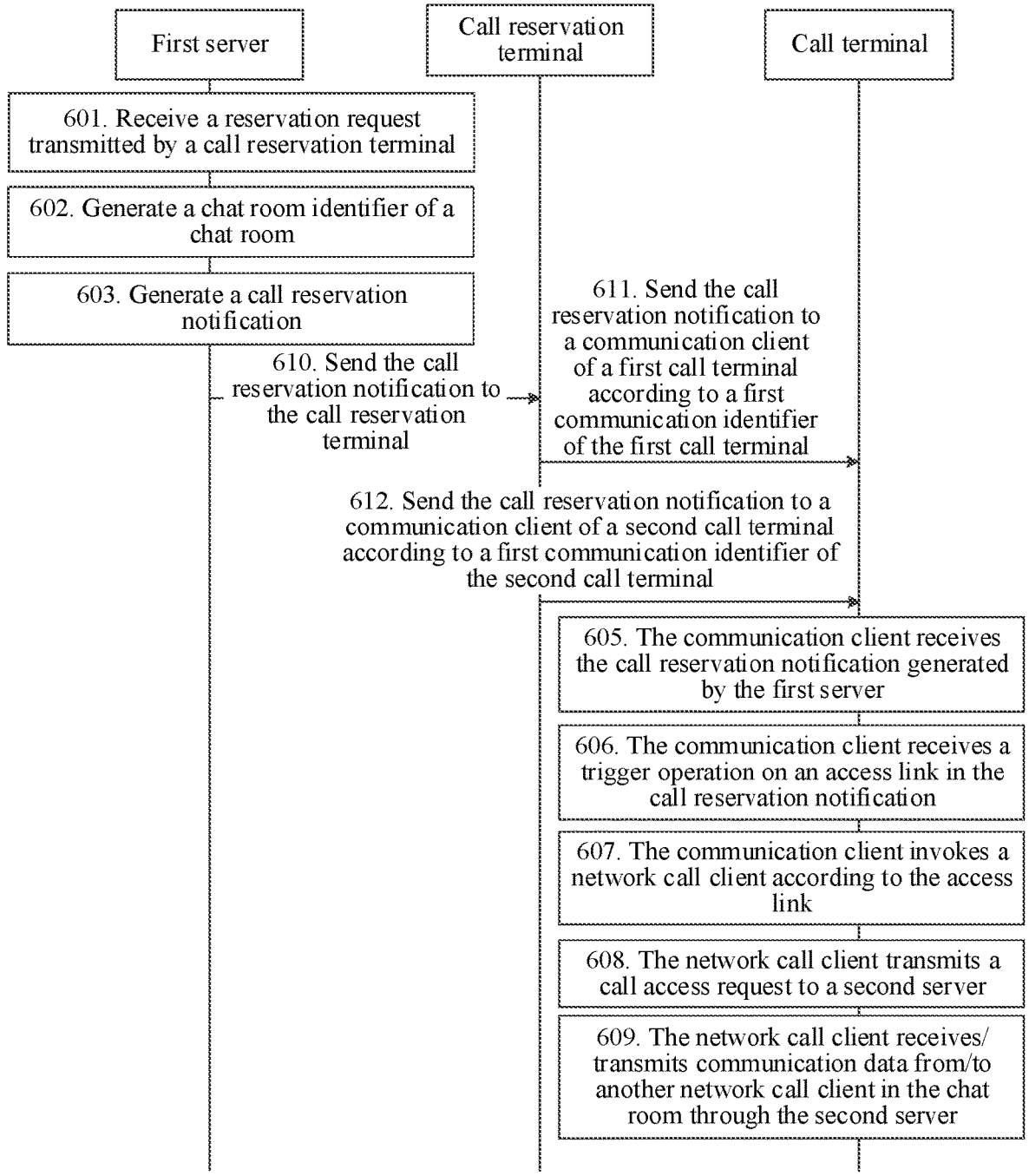
FIG. 6E is a flowchart of a network call method according to another embodiment.

FIG. 6E is a flowchart of a network call method according to an embodiment of this application. The network call method is applied to the network call system shown in FIG. 5. Based on the embodiment shown in FIG. 6D, the method may include the following step:

Step 611. The call reservation terminal transmits the call reservation notification to a communication client of a first call terminal according to a first communication identifier of the first call terminal.

In one embodiment, the at least two call terminals further include a second call terminal. After step 610, the method further includes the following step:

Step 612. The call reservation terminal transmits the call reservation notification to a communication client of a second call terminal according to a first communication identifier of the second call terminal.

In one embodiment, in this scenario, the call reservation terminal may encapsulate the call reservation notification according to a preset template, thereby optimizing the call reservation notification displayed in the call terminal.

In one example, referring to FIG. 2, the call reservation notification 220 is transmitted to the call terminal by the call reservation terminal. In the call reservation notification 220, the access link is encapsulated into a virtual access button 221. An xx company logo 222 is drawn in display background of the call reservation notification.

Based on the foregoing, according to the network call method provided in the embodiments, the call reservation terminal forwards the call reservation notification generated by the first server to the call terminal, thereby reducing the burden on the first server.

In one embodiment, in the network call, different call terminals may have different caller identities. The call terminals having different identities may have different displayed names in the network call.

For example, in an interview-type network call, a call terminal whose caller identity is an interviewer has a displayed name "interviewer" in the network call. In this way, privacy of a call party corresponding to the call terminal can be ensured. A call terminal whose caller identity is an interviewee has a displayed name interviewee in the network call. In this way, it can be ensured that the interviewer determines which interviewee is being interviewed.

For another example, in an inquiry-type network call, a call terminal whose caller identity is a doctor has a displayed name "doctor" in the network call. In this way, privacy of a call party corresponding to the call terminal can be ensured. A call terminal whose caller identity is a patient has a displayed name patient in the network call. In this way, it can be ensured that the doctor determines which patient is being inquired.

For another example, in a teaching-type network call, a call terminal whose caller identity is a teacher has a displayed name "teacher" in the network call. A call terminal whose caller identity is a student has a displayed name "student" in the network call. In this way, privacy of call parties corresponding to all call terminals can be ensured.

For another example, in a legal-consulting-type network call, a call terminal whose caller identity is a lawyer has a displayed name "lawyer" in the network call. In this way, privacy of a call party corresponding to the call terminal can be ensured. A call terminal whose caller identity is a counselee has a displayed name counselee in the network call. In this way, it can be ensured that the lawyer determines which counselee is being offered legal assistance.

For another example, in an enterprise-type network call, a call terminal whose caller identity is a leader has a displayed name leader in the network call. A call terminal whose caller identity is a staff member has a displayed name staff member. In this way, it can be ensured that each call party determines which person is speaking.

In one embodiment, in the same network call, each caller identity corresponds to at least one call terminal.

For each call terminal participating in the same network call, to enable the call terminal to determine a displayed name of another call terminal participating in the network call, the call terminal needs to obtain a caller identity of the another call terminal.

Figure 10:
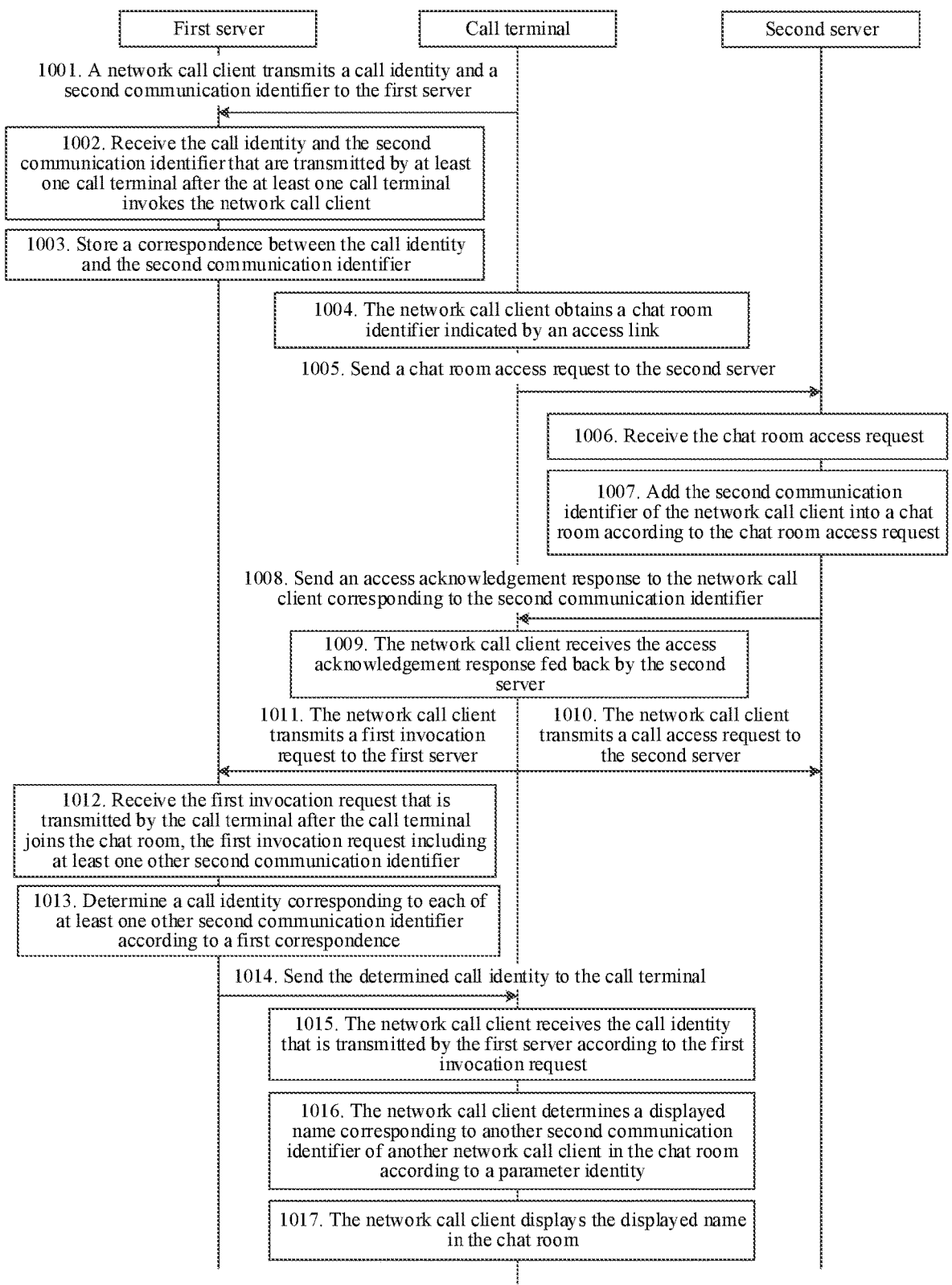
FIG. 10 is a flowchart of a network call method according to an embodiment.

FIG. 10 is a flowchart of a network call method according to another embodiment of this application. The network call method is applied to the network call system shown in FIG. 5. Based on the embodiment shown in FIG. 6, after step 607, the method may include the following steps:

Step 1001. A network call client in a call terminal transmits a caller identity and a second communication identifier to a first server.

In one embodiment, the caller identity is represented by using an identity identifier. For example, an identity identifier 1 represents a caller identity of an interviewer, and an identity identifier 2 represents a caller identity of an interviewee.

In one embodiment, the network call client in the call terminal further transmits a chat room identifier to the first server.

The second communication identifier is used for logging in to the network call client. In one embodiment, the second communication identifier is a phone number, an identity card number, or an email address of a call party, or a random character string allocated by a second server.

Step 1002. The first server receives the caller identity and the second communication identifier that are transmitted by at least one call terminal.

The network call client is configured to access a chat room created by the second server.

In one embodiment, different call terminals possibly invoke the network call client at different moments. Therefore, the first server possibly receives caller identities and second communication identifiers that are transmitted by different call terminals at different moments.

Step 1003. The first server stores a correspondence between the caller identity and the second communication identifier.

Figures 11, 12:
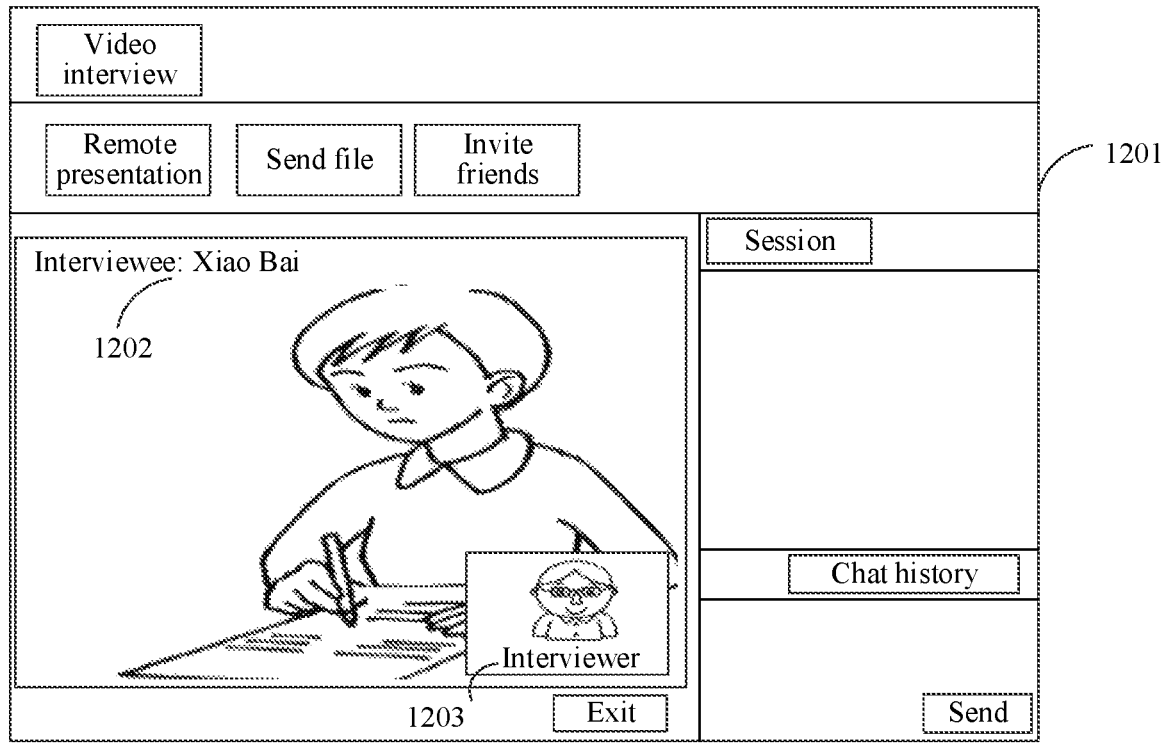
FIG. 11 is a schematic diagram of a first correspondence according to an embodiment.
FIG. 12 is a schematic diagram of a chat room according to an embodiment.

Referring to FIG. 11, a correspondence 1100 stored in the first server includes a correspondence between a second communication identifier 1101 and a caller identity 1102. The correspondence 1100 further includes a correspondence between the second communication identifier 1101 and a chat room identifier 1103.

Step 1004. The network call client in the call terminal obtains a chat room identifier indicated by an access link. This step is an alternative step of step 608.

When invoking the network call client, a communication client transmits the chat room identifier indicated by the access link to the network call client. The network call client obtains the chat room identifier.

Step 1005. The network call client transmits a chat room access request to the second server.

The chat room access request includes the chat room identifier. The chat room access request is used by the second server to add the network call client into the chat room. The chat room access request includes the second communication identifier and the chat room identifier of the chat room.

When receiving the call reservation notification, the call terminal has not accessed the chat room. Therefore, the chat room access request needs to be first transmitted to the second server to access the chat room, and then a call access request can be transmitted to the chat room.

Step 1006. The second server receives the chat room access request.

Step 1007. The second server adds the second communication identifier of the network call client into the chat room according to the chat room access request.

Step 1008. The second server transmits an access acknowledgement response to the network call client corresponding to the second communication identifier.

The access acknowledgement response is used for indicating that the network call client successfully accesses the chat room.

Step 1009. The network call client in the call terminal receives the access acknowledgement response fed back by the second server.

In one embodiment, steps 1004-1009 may be performed after steps 1001-1003, or may be performed before steps 1001-1003, or may be performed simultaneously with steps 1001-1003, which is not limited in this embodiment.

Step 1010. The network call client in the call terminal transmits a call access request to the second server.

Step 1011. The network call client in the call terminal transmits a first invocation request to the first server.

The first invocation request is used for requesting a caller identity of a call terminal corresponding to another network call client. The first invocation request includes a second communication identifier of the network call client in the chat room.

The network call client is a network call client different from the network call client transmitting the first invocation request in the same chat room. In this case, at least two other network call clients access the chat room.

In one embodiment, the first invocation request further includes the second communication identifier of the network call client transmitting the first invocation request.

Step 1012. The first server receives the first invocation request that is transmitted by the call terminal after the call terminal joins the chat room, the first invocation request including at least another second communication identifier.

The another second communication identifier is a second communication identifier in the chat room other than the second communication identifier in the user terminal transmitting the first invocation request, that is, a second communication identifier of another network call client.

Step 1013. The first server determines a caller identity corresponding to the another second communication identifier according to a first correspondence.

The first correspondence includes at least a correspondence between the another second communication identifier and the caller identity.

For example, the another second communication identifier received by the first server includes 1234567, 2345678, and 3456789. According to a correspondence shown in FIG. 11, it can be known that a caller identity corresponding to 1234567 is an interviewer, a caller identity corresponding to 2345678 is an interviewer, and a caller identity corresponding to 3456789 is an interviewee.

Step 1014. The first server transmits the determined caller identity to the call terminal.

The caller identity is used by the network call client in the call terminal to determine a displayed name corresponding to at least one second communication identifier in the chat room.

Step 1015. The network call client in the call terminal receives the caller identity that is transmitted by the first server according to the first invocation request.

Step 1016. The network call client in the call terminal determines a displayed name corresponding to another second communication identifier of another network call client in the chat room according to a parameter identity.

The chat room includes the network call client and the another network call client.

In one embodiment, the network call client in the call terminal determines a local displayed name according to an identity identifier in link information.

In one embodiment, the network call client pre-stores a name display policy corresponding to each caller identity. The network call client determines the displayed name corresponding to the second communication identifier according to the name display policy corresponding to each identity.

In one embodiment, a correspondence between the caller identity and the name display policy may be transmitted by the first server to the network call client, or may be pre-stored in the network call client.

For example, the name display policy is: A displayed name corresponding to a second communication identifier of the caller identity of an interviewer is "interviewer"; and a displayed name corresponding to a second communication identifier of the caller identity of an interviewee is a real name of the interviewee.

For another example, the name display policy is: A displayed name corresponding to a second communication identifier of the caller identity of a doctor is "doctor"; and a displayed name corresponding to a second communication identifier of the caller identity of a patient is a real name of the patient.

For another example, the name display policy is: A displayed name corresponding to a second communication identifier of the caller identity of a teacher is "teacher"; and a displayed name corresponding to a second communication identifier of the caller identity of a student is "student".

For another example, the name display policy is: A displayed name corresponding to a second communication identifier of the caller identity of a lawyer is "lawyer"; and a displayed name corresponding to a second communication identifier of the caller identity of a counselee is a real name of the counselee.

For another example, the name display policy is: A displayed name corresponding to a second communication identifier of the caller identity of a leader is the name and position of the leader; and a displayed name corresponding to a second communication identifier of the caller identity of a staff member is a name and a position of the staff member.

Step 1017. The network call client in the call terminal displays the displayed name in the chat room.

Referring to FIG. 12, a chat room 1201 includes a second communication identifier of the caller identity of an interviewee. A displayed name corresponding to the second communication identifier is a real name 1202 of the interviewee. The chat room 1201 further includes a second communication identifier of the caller identity of an interviewer. A displayed name corresponding to the second communication identifier is "interviewer" 1203.

In one embodiment, steps 1011-1017 may be performed after step 1010, or may be performed before step 1010, or may be performed simultaneously with step 1010, which is not limited in this embodiment.

Base on the foregoing, according to the network call method provided in the embodiments, displayed names corresponding to different second communication identifiers in a virtual network call room are determined, thereby meeting privacy requirements of call parties having different caller identities, and improving security of the network call.

In one embodiment, steps 1001, 1004, 1005, 1009, 1010, 1011, and 1015-1017 may be independently implemented as a method embodiment at a side of the call terminal. Steps 1002, 1003, and 1012-1014 may be independently implemented as a method embodiment at a side of the first server. Steps 1006, 1007, and 1008 may be independently implemented as a method embodiment at a side of the second server, which is not limited in this embodiment.

In one embodiment, the first invocation request may include the second communication identifier of the network call client transmitting the first invocation request and the chat room identifier. The first server transmits, to the call terminal, caller identities corresponding to other second communication identifiers than the second communication identifier in the first invocation request, among second communication identifiers added into the chat room corresponding to the chat room identifier.

In one embodiment, the network call client pre-stores an information access policy corresponding to each caller identity. After receiving the caller identity, the network call client may determine, according to the information access policy corresponding to each caller identity, whether to allow account information corresponding to the second communication identifier to be accessed.

In one embodiment, the account information includes but is not limited to at least one of an age, a native place, a birthdate, a constellation, and a Chinese zodiac.

In one embodiment, the first server stores a join notification corresponding to different caller identities. The join notification is used for notifying that the call party corresponding to the network call client successfully joins the chat room as the caller identity.

Figure 13:
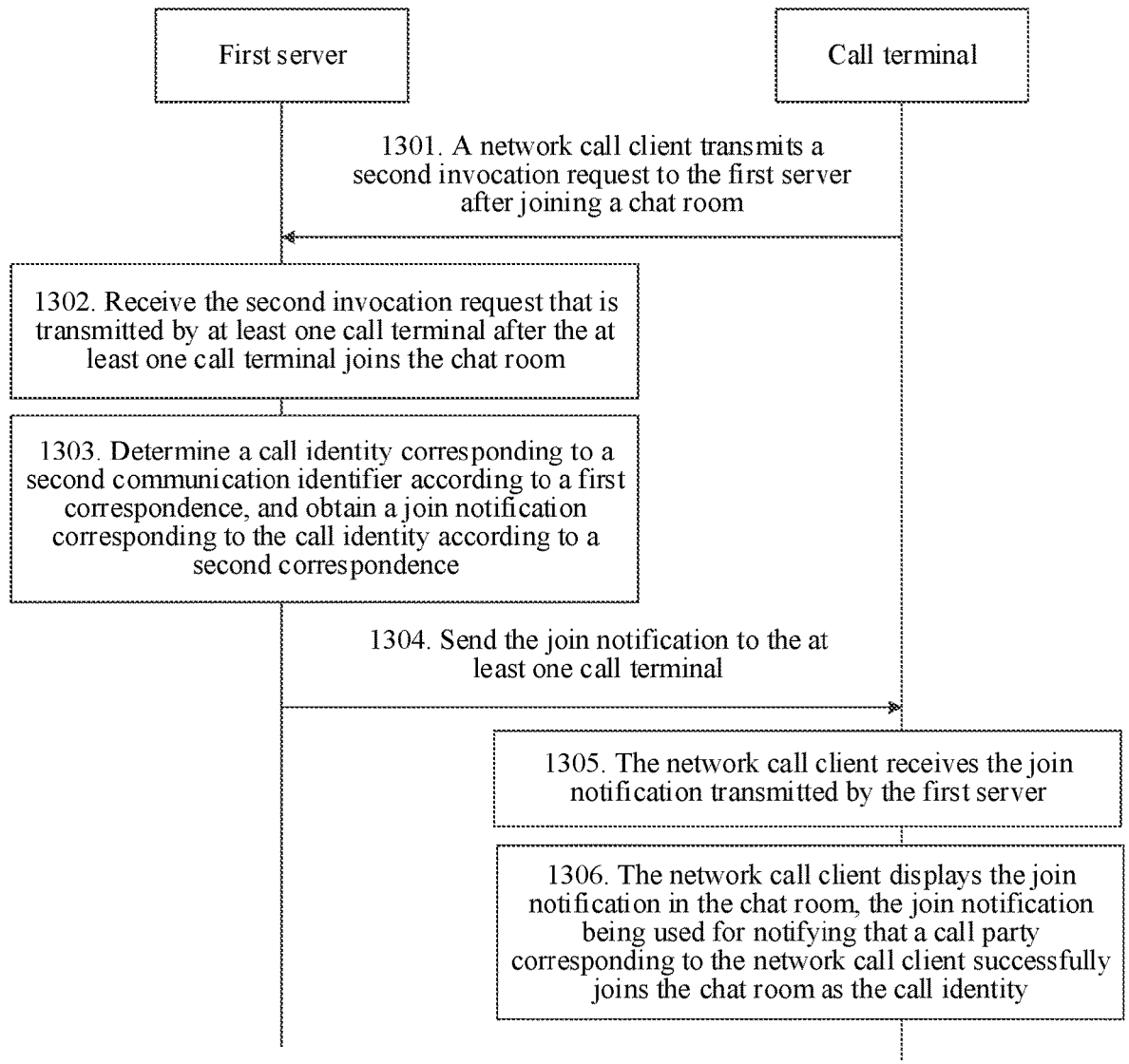
FIG. 13 is a flowchart of a network call method according to an embodiment.

FIG. 13 is a flowchart of a network call method according to another embodiment of this application. The network call method is applied to the network call system shown in FIG. 5. Based on the embodiment shown in FIG. 10, after step 1009, the method may include the following steps:

Step 1301. The network call client in the call terminal transmits a second invocation request to the first server after joining the chat room.

The second invocation request is used for requesting the first server to determine a join notification corresponding to a second communication identifier. The second invocation request includes the second communication identifier of the network call client.

Step 1302. The first server receives the second invocation request that is transmitted by at least one call terminal after the at least one call terminal joins the chat room.

Step 1303. The first server determines a caller identity corresponding to the second communication identifier according to a first correspondence, and obtains a join notification corresponding to the caller identity according to a second correspondence.

For details of related descriptions of determining, by the first server, a caller identity corresponding to the second communication identifier according to a first correspondence, reference is made to step 1013, and the details are not described again in this step.

In one embodiment, a type of the join notification includes but is not limited to at least one of animation, video, voice, and text.

The second correspondence includes at least a correspondence between the second communication identifier in the call terminal transmitting the second invocation request and the join notification.

Figure 14:
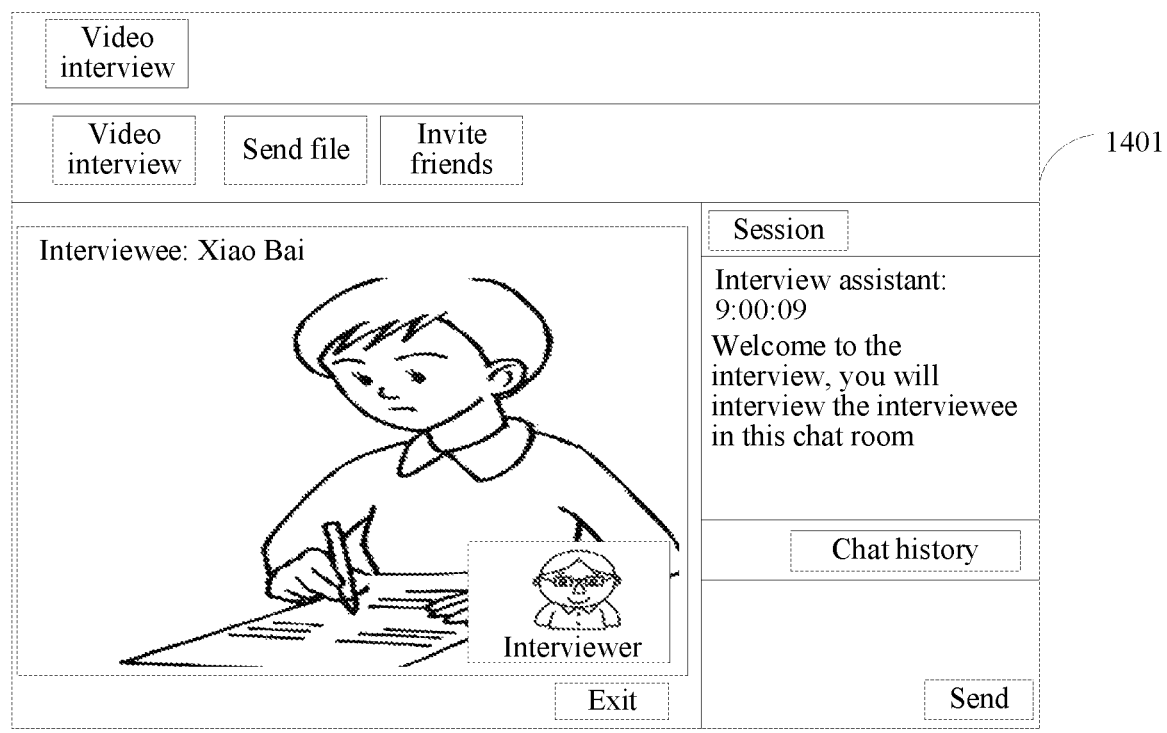
FIG. 14 is a schematic diagram of a chat room according to an embodiment.

Referring to a second correspondence 1400 between a caller identity and a join notification shown in FIG. 14, if the caller identity determined by the first server is an interviewer, the corresponding join notification is 1401; if the caller identity determined by the first server is an interviewee, the corresponding join notification is 1402.

Step 1304. The first server transmits the join notification to the at least one call terminal.

Step 1305. The network call client in the call terminal receives the join notification transmitted by the first server.

Step 1306. The network call client in the call terminal displays the join notification in the chat room, the join notification being used for notifying that the call party corresponding to the network call client successfully joins the chat room as the caller identity.

Referring to FIG. 14, after a call terminal whose caller identity is an interviewer joins the chat room 1401, a displayed join notification is "Welcome to join the interview. You will interview the interviewee in this chat room".

Figure 15:
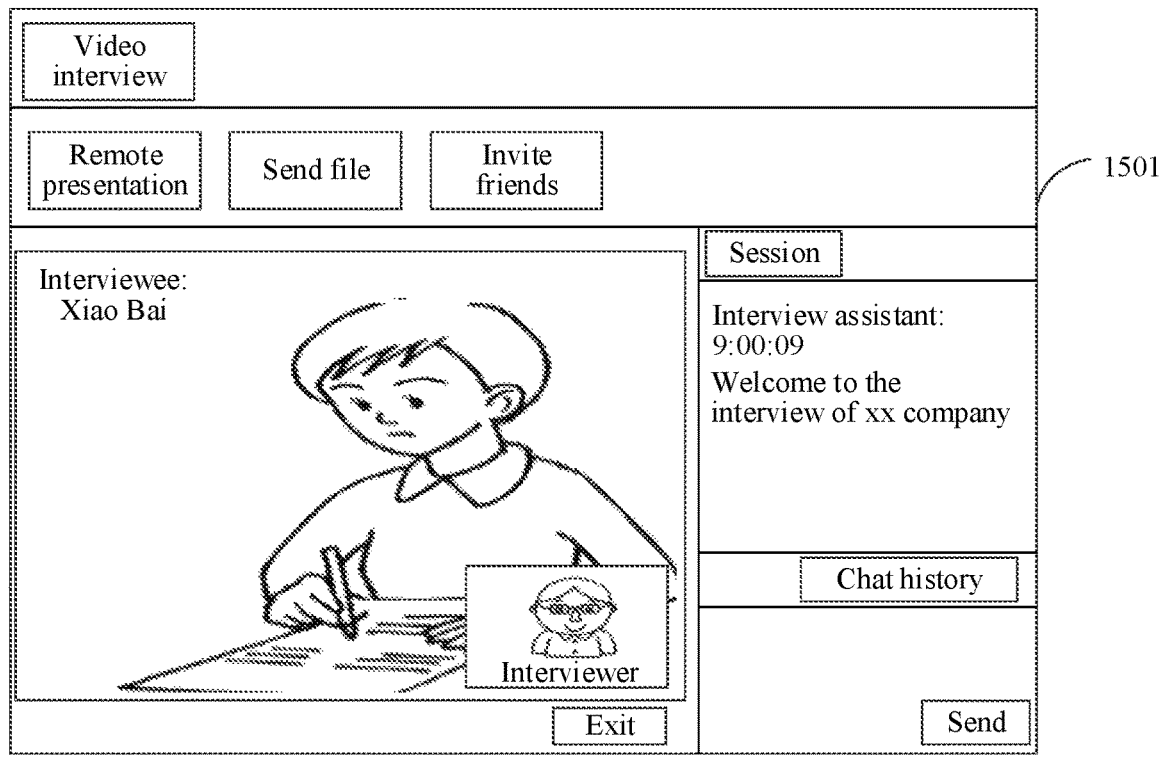
FIG. 15 is a schematic diagram of a chat room according to an embodiment.

Referring to FIG. 15, after a call terminal whose caller identity is an interviewee joins a chat room 1501, a displayed join notification is "Welcome to the interview of xx company".

Based on the foregoing, according to the network call method provided in the embodiments, join notifications are determined after call terminals join the chat room, thereby ensuring that call parties having different caller identities determine the caller identities in the chat room according to the join notifications.

In one embodiment, when at least two call parties participating in the network call have different caller identities, the first server transmits related information of a call party having a first caller identity to a call terminal used by a call party having a second caller identity. In one embodiment, the first server transmits related information of the call party having the second caller identity to a call terminal used by the call party having the first caller identity.

In one example, the caller identities of the at least two call parties participating in the network call are an interviewer and an interviewee. The first server transmits related information of the interviewee to a call terminal used by the interviewer.

In one embodiment, before the first server transmits the related information of the call party having the first caller identity to the call terminal used by the call party having the second caller identity, the first server encrypts the related information of the call party having the first caller identity and transmits the encrypted related information of the call party to the call terminal used by the call party having the second caller identity.

In one embodiment, after receiving the encrypted related information of the call party, the call terminal used by the call party having the second caller identity decrypts the encrypted related information of the call party through the network call client and displays the decrypted related information of the call party.

Figure 16:
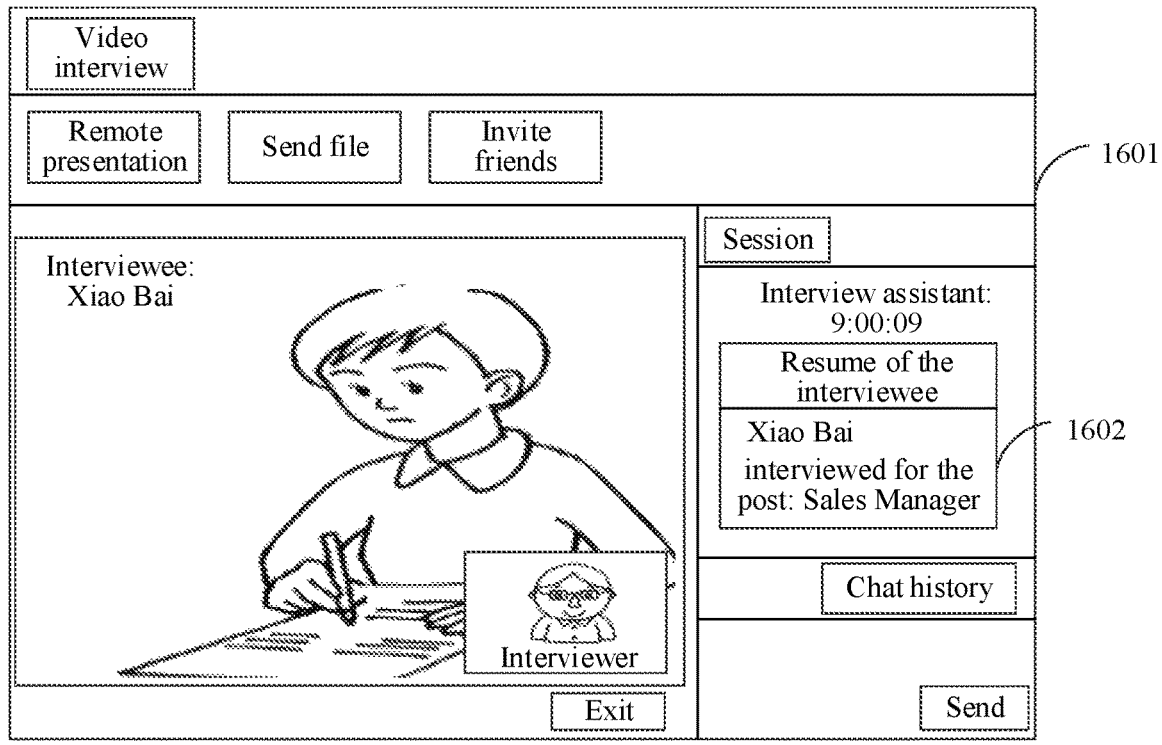
FIG. 16 is a schematic diagram of a chat room according to an embodiment.

Referring to a chat room 1601 displayed in the call terminal used by the interviewer shown in FIG. 16, the chat room 1601 displays related information 1602 of the interviewee.

In one embodiment, the call terminal accessing the chat room may invite, through the network call client, a friend terminal having a friend relationship with the call terminal to access the chat room.

The friend terminal is a terminal of which a second account number for logging in to the network call client has a friend relationship with a first account number for logging in to the network call client in the call terminal.

In this case, the call terminal transmits the chat room identifier of the chat room, the second account number, and a caller identity of the friend terminal to the first server, and transmits a member addition request to the second server.

The first server establishes a correspondence between the second account number and the chat room identifier and the caller identity. When the first server receives a first invocation request transmitted by another call terminal in the chat room and the first invocation request includes the second account number and the chat room identifier, the first server transmits the caller identity to the another call terminal, so that the another call terminal determines a displayed name corresponding to the second account number according to the caller identity.

The second server receives the addition request, and adds the second account number in the addition request into the chat room.

In one embodiment, the call terminal accessing the chat room may invite, by forwarding the call reservation notification to another terminal, the another terminal to access the chat room.

In one embodiment, an exit option is set in the chat room. When needing to exit the chat room, a call party triggers the exit option. Correspondingly, the network call client receives the trigger operation on the exit option. The network call client generates a disconnection instruction according to the trigger operation, and transmits the disconnection instruction to the second server. The second server breaks the communications connection to the network call client according to the disconnection instruction.

In one embodiment, before transmitting the disconnection instruction to the second server, the network call client generates an enquiry message. The enquiry message is used for asking the call party whether to exit the chat room. When receiving a confirmation operation, the disconnection instruction is transmitted to the second server.

Figure 17:
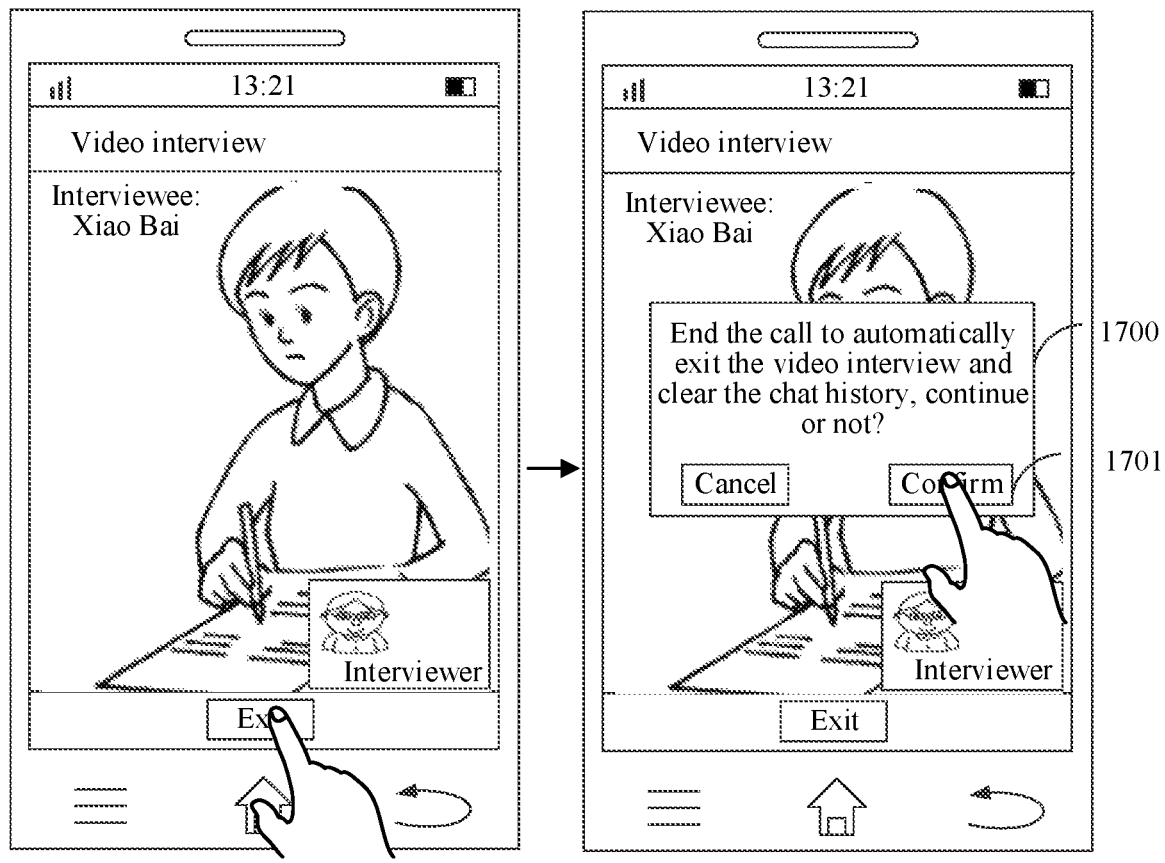
FIG. 17 is a schematic diagram of exiting a chat room according to an embodiment.

Referring to FIG. 17, after receiving the trigger operation on the exit option, the network call client displays enquiry information 1700, and transmits the disconnection instruction to the second server when receiving the confirmation operation performed on a confirmation option 1701 in the enquiry information 1700.

In one embodiment, after breaking the communications connection to the second server, the network call client deletes a conference record in the chat room.

In one embodiment, the network call client may not only include a chat room, but also include a general discussion group. The general discussion group is a discussion group the network call client triggers the second server to establish. The chat room and the general discussion group are both managed by the second server.

Before step 1011 and/or step 1301, the network call client in the call terminal determines whether a joined discussion group is the chat room. When the joined discussion group is the chat room, step 1011 and/or step 1301 is performed. Otherwise, the process ends.

The discussion group includes a chat room and a general discussion group.

Each discussion group includes a type identification field. When the type identification field indicates that the discussion group is a chat room, the joined discussion group is determined to be the chat room; when the type identification field indicates that the discussion group is a general discussion group, the joined discussion group is determined to be the general discussion group.

In one embodiment, the type identification field includes at least one of a number, a letter, and a symbol. In one example, when the type identification field is 1, it indicates that the discussion group is a chat room; when the type identification field is 0, it indicates that the discussion group is a general discussion group.

In one embodiment, based on the foregoing embodiments, when the network call client is not installed in the call terminal, the network call client is downloaded and installed. Alternatively, a web page client corresponding to the network call client is loaded and run by using a jump page, and a call access request is transmitted to the second server through the web page client, to access the chat room to perform a network call.

When the web page client corresponding to the network call client is loaded and run by using the jump page to access the chat room, in step 940, the first server transmits a jump page and a web page invocation component to the first call terminal according to the second invocation request, the web page invocation component being configured to invoke the web page client corresponding to the network call client when the browser program fails to invoke the network call client; and in step 950, the browser program in the first call terminal further receives the web page invocation component. In this case, when the network call client is not installed, the browser program loads and runs the web page client by invoking the web page invocation component through the jump page, and the web page client transmits the call access request to the second server. The call access request is used by the second server to establish a communications connection to the web page client in the chat room.

The web page client corresponding to the network call client is configured to implement functions of the network call client in a web page.

In one embodiment, the web page invocation component includes a web page address of the web page client.

If the call terminal accesses the chat room by using the web page client, an entity for performing steps 608, 609, 1010, 1011, 1015, 1016, 1017, 1305, and 1306 is replaced with the web page client in the first call terminal.

In one embodiment, in the foregoing embodiments, the second communication identifier is registered in the second server in advance, and the second server records account information corresponding to the second communication identifier, for example, a registration time, account information, and an account password.

In one embodiment, when the call terminal does not register the second communication identifier of the network call client in the second server, after step 607, the second server may allocate a temporary second communication identifier to the network call client. In this way, the network call client may access the chat room according to the temporary second communication identifier without performing the step of registering the second communication identifier in advance.

An example of a network call method provided in one embodiment of this application is described below. In this example, a call reservation terminal used by a reservation maker of a network call initiates the network call, a call type of the network call is an interview conference, caller identities of call parties participating in the interview conference include an interviewer and an interviewee, a call terminal used by the interviewer is a call terminal A, and a call terminal used by the interviewee is a call terminal B. The call reservation terminal, the call terminal A, and the call terminal B are call terminals independent from each other. The call terminal A first accesses the chat room, and then the call terminal B accesses the chat room.

Figure 18A:
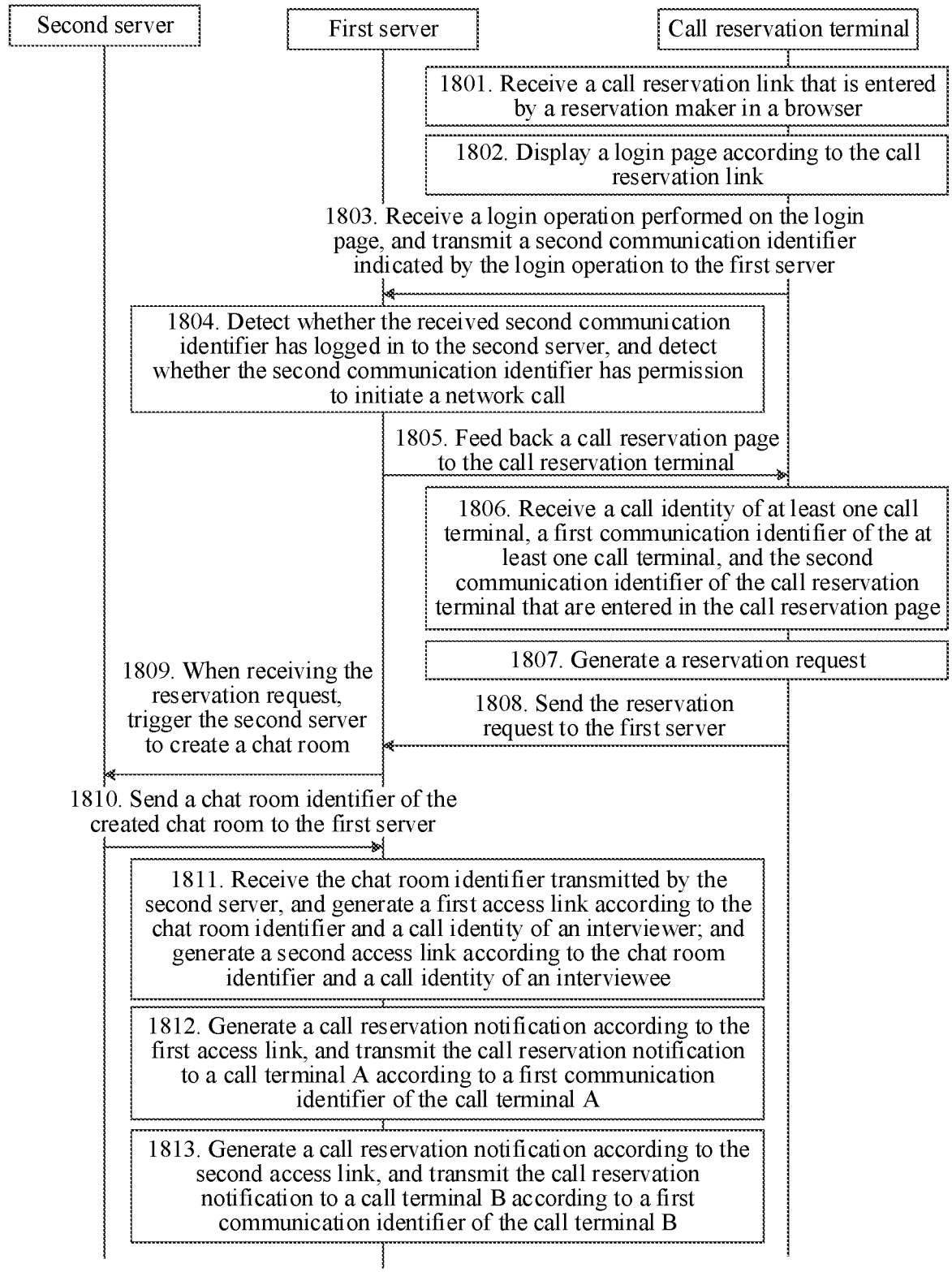
FIG. 18A is a flowchart of a network call method according to an embodiment.
Figure 18B:
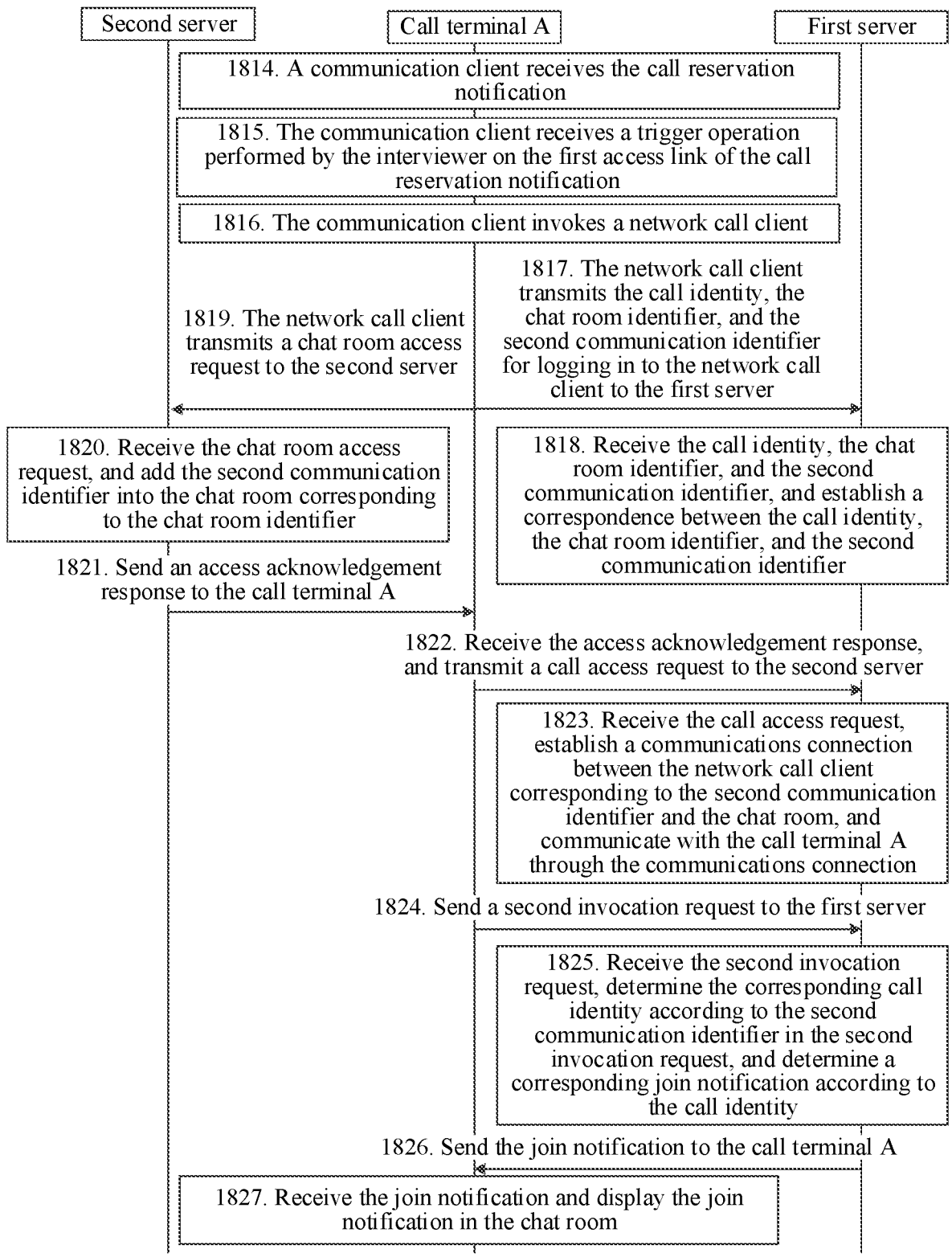
FIG. 18B is a flowchart of a network call method according to an embodiment.
Figure 18C:
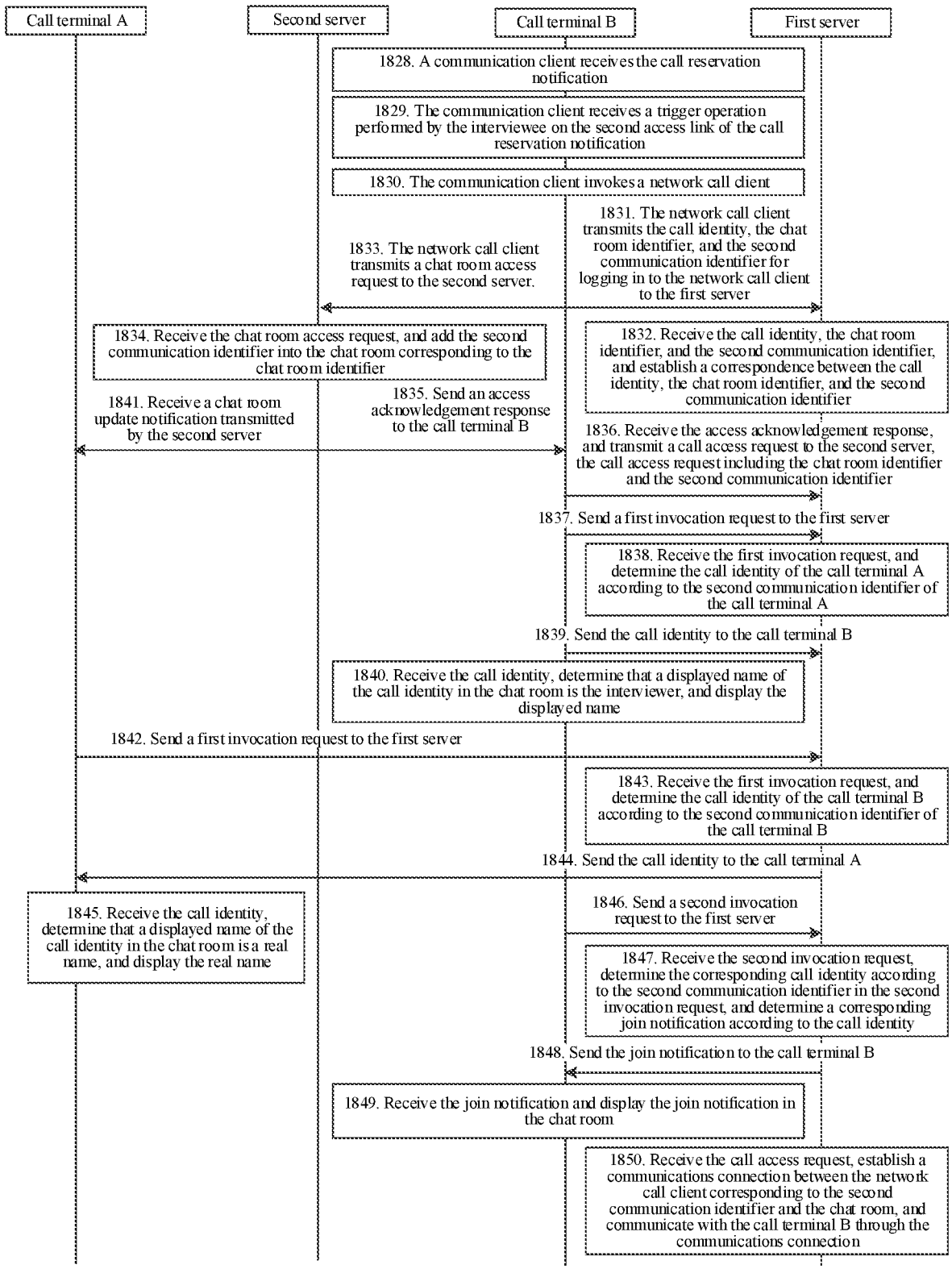
FIG. 18C is a flowchart of a network call method according to an embodiment.

FIG. 18A to FIG. 18C constitute a flowchart of a method for convening an interview conference according to an embodiment of this application. The process is divided into three parts, which are described below.

First part (referring to FIG. 18A): An interview initiation process is performed.

Step 1801. The call reservation terminal receives a call reservation link that is entered by the reservation maker in a browser.

Step 1802. The call reservation terminal displays a login page according to the call reservation link.

The login page is used by the reservation maker to use a second communication identifier of a network call client to log in to a second server corresponding to the network call client.

Step 1803. The call reservation terminal receives a login operation performed on the login page, and transmits the second communication identifier indicated by the login operation to a first server.

Step 1804. The first server detects whether the received second communication identifier has logged in to the second server, and detects whether the second communication identifier has a permission to initiate a network call.

The first server transmits a status detection request to the second server. The status detection request is used for requesting the second server to detect whether the second communication identifier has logged in to the second server, and the status detection request includes the second communication identifier. If detecting that the second communication identifier has logged in to the second server, the second server sends back an acknowledgement response to the first server, and the first server determines that the received second communication identifier has logged in to the second server. If detecting that the second communication identifier has not logged in to the second server, the second server sends back a non-acknowledgement response to the first server, and the first server determines that the received second communication identifier has not logged in to the second server.

The first server pre-stores a library of second communication identifiers having permission to initiate a network call. The first server detects whether the second communication identifier library includes a second communication identifier matching the received second communication identifier. If so, the second communication identifier is determined to have permission to initiate a network call. If not, the second communication identifier is determined not to have permission to initiate a network call.

Step 1805 is performed when the first server determines that the received second communication identifier has logged in to the second server and the second communication identifier has permission to initiate a network call. The process ends when the first server determines that the received second communication identifier has not logged in to the second server or the second communication identifier does not have permission to initiate a network call.

Step 1805. The first server sends back a call reservation page to the call reservation terminal.

Step 1806. The call reservation terminal receives a caller identity of at least one call terminal, a first communication identifier of the at least one call terminal, and the second communication identifier of the call reservation terminal that are entered in the call reservation page.

Step 1807. The call reservation terminal generates a reservation request.

The reservation request includes the caller identity of the at least one call terminal, the first communication identifier of the at least one call terminal, and the second communication identifier of the call reservation terminal.

Step 1808. The call reservation terminal transmits the reservation request to the first server.

Step 1809. When receiving the reservation request, the first server triggers the second server to create a chat room.

After the second server successfully creates the chat room, the second communication identifier used by the reservation maker is deleted from the chat room. In this case, the chat room is empty.

Step 1810. The second server transmits a chat room identifier of the created chat room to the first server.

Step 1811. The first server receives the chat room identifier transmitted by the second server and generates a first access link according to the chat room identifier and the caller identity of the interviewer; and generates a second access link according to the chat room identifier and the caller identity of the interviewee.

Step 1812. The first server generates a call reservation notification according to the first access link, and transmits the call reservation notification to the call terminal A according to a first communication identifier of the call terminal A.

Step 1813. The first server generates a call reservation notification according to the second access link, and transmits the call reservation notification to the call terminal B according to a first communication identifier of the call terminal B.

Second part (referring to FIG. 18B): Start an interview process.

Step 1814. A communication client in the call terminal A receives the call reservation notification.

Step 1815. The communication client in the call terminal A receives a trigger operation that is performed by the interviewer on the first access link of the call reservation notification.

Step 1816. The communication client in the call terminal A invokes a network call client.

The communication client transmits the caller identity of the interviewer and the chat room identifier indicated by the access link to the network call client.

Step 1817. The network call client in the call terminal A transmits the caller identity, the chat room identifier, and the second communication identifier for logging in to the network call client to the first server.

Step 1818. The first server receives the caller identity, the chat room identifier, and the second communication identifier, and establishes a correspondence between the caller identity, the chat room identifier, and the second communication identifier.

Step 1819. The network call client in the call terminal A transmits a chat room access request to the second server, the chat room access request including the chat room identifier and the second communication identifier.

Step 1820. The second server receives the chat room access request, and adds the second communication identifier into the chat room corresponding to the chat room identifier.

Step 1821. The second server transmits an access acknowledgement response to the call terminal A.

The access acknowledgement response is used for indicating that the network call client successfully accesses the chat room.

Step 1822. The call terminal A receives the access acknowledgement response, and transmits a call access request to the second server.

The call access request includes the chat room identifier and the second communication identifier.

Step 1823. The second server receives the call access request, establishes a communications connection between the network call client corresponding to the second communication identifier and the chat room, and communicates with the call terminal A through the communications connection.

Step 1824. The call terminal A transmits a second invocation request to the first server, the second invocation request including the chat room identifier and the second communication identifier.

Step 1825. The first server receives the second invocation request, determines the corresponding caller identity according to the second communication identifier in the second invocation request, and determines a corresponding join notification according to the caller identity.

Step 1826. The first server transmits the join notification to the call terminal A.

Step 1827. The call terminal A receives the join notification and displays the join notification in the chat room.

Third part (referring to FIG. 18C): The call terminal B joins the chat room.

Step 1828. A communication client in the call terminal B receives the call reservation notification.

Step 1829. The communication client in the call terminal B receives a trigger operation that is performed by the interviewee on the second access link of the call reservation notification.

Step 1830. The communication client in the call terminal B invokes a network call client.

The communication client transmits the caller identity of the interviewee and the chat room identifier indicated by the access link to the network call client.

Step 1831. The network call client in the call terminal B transmits the caller identity, the chat room identifier, and the second communication identifier for logging in to the network call client to the first server.

Step 1832. The first server receives the caller identity, the chat room identifier, and the second communication identifier, and establishes a correspondence between the caller identity, the chat room identifier, and the second communication identifier.

Step 1833. The network call client in the call terminal B transmits a chat room access request to the second server.

The chat room access request includes the chat room identifier and the second communication identifier.

Step 1834. The second server receives the chat room access request, and adds the second communication identifier into the chat room corresponding to the chat room identifier.

Step 1835. The second server transmits an access acknowledgement response to the call terminal B.

The access acknowledgement response is used for indicating that the network call client successfully accesses the chat room.

Step 1836. The call terminal B receives the access acknowledgement response, and transmits the call access request to the second server, the call access request including the chat room identifier and the second communication identifier.

Step 1837. The call terminal B transmits a first invocation request to the first server, the first invocation request including the chat room identifier and the second communication identifier of the call terminal A in the chat room.

Step 1838. The first server receives the first invocation request, and determines the caller identity of the call terminal A according to the second communication identifier of the call terminal A.

Step 1839. The first server transmits the caller identity to the call terminal B.

Step 1840. The call terminal B receives the caller identity, determines that a displayed name of the caller identity in the chat room is the interviewer, and displays the displayed name.

Step 1841. The call terminal A receives a chat room update notification transmitted by the second server.

Step 1842. The call terminal A transmits a first invocation request to the first server, the first invocation request including the chat room identifier and the second communication identifier of the call terminal B in the chat room.

Step 1843. The first server receives the first invocation request, and determines the caller identity of the call terminal B according to the second communication identifier of the call terminal B.

Step 1844. The first server transmits the caller identity to the call terminal A.

Step 1845. The call terminal A receives the caller identity, determines that a displayed name of the caller identity in the chat room is a real name, and displays the real name.

Step 1846. The call terminal B transmits a second invocation request to the first server, the second invocation request including the chat room identifier and the second communication identifier.

Step 1847. The first server receives the second invocation request, determines the corresponding caller identity according to the second communication identifier in the second invocation request, and determines a corresponding join notification according to the caller identity.

Step 1848. The first server transmits the join notification to the call terminal B.

Step 1849. The call terminal B receives the join notification and displays the join notification in the chat room.

Step 1850. The second server receives the call access request, establishes a communications connection between the network call client corresponding to the second communication identifier and the chat room, and communicates with the call terminal B through the communications connection.

Obviously, steps in the embodiments of this application are not necessarily performed in the sequence indicated by the step numbers. Unless explicitly stated in this specification, the steps are not necessarily performed in a strict sequence, and the steps may be performed in another sequence. Further, at least some of the steps in each embodiment may include a plurality of sub-steps or a plurality of stages. The sub-steps or stages are not necessarily performed at the same moment but may be performed at different moments. The sub-steps or stages are not necessarily sequentially performed, but may be performed alternately with other steps or at least some of sub-steps or stages of other steps.

Apparatus embodiments of this application are described below. The server or the call terminal may perform the method embodiments of this application by using an apparatus. For details not disclosed in the apparatus embodiments of this application, reference is made to the method embodiments of this application.

Figure 19:
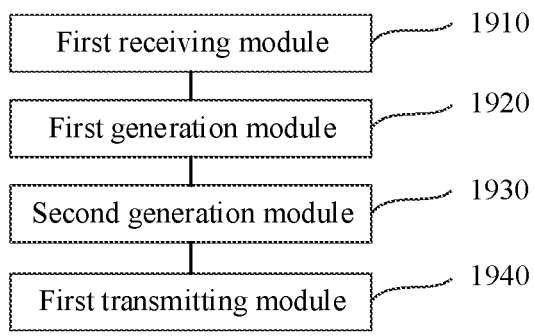
FIG. 19 is a block diagram of a network call apparatus according to an embodiment.

FIG. 19 is a block diagram of a network call apparatus according to an embodiment of this application. The network call apparatus is included in a first server. For an internal structure of the first server, refer to a structure shown in FIG. 22. Some or all of the following modules may be implemented by using software, hardware, or a combination thereof. The apparatus may include: a first receiving module 1901, a first generation module 1902, a second generation module 1903, and a first transmitting module 1904.

The first receiving module 1901 is configured to receive a reservation request transmitted by a call reservation terminal, the reservation request including a first communication identifier of a first call terminal, a communication client being installed in the first call terminal, and the first communication identifier being a communication identifier corresponding to the communication client.

The first generation module 1902 is configured to generate a chat room identifier of a chat room, the chat room being used by at least two call terminals to perform a network call, and the at least two call terminals including the first call terminal.

The second generation module 1903 is configured to generate a call reservation notification, the call reservation notification including an access link generated according to the chat room identifier.

The first transmitting module 1904 is configured to transmit the call reservation notification to the first call terminal according to the first communication identifier, the call reservation notification being used for instructing the first call terminal to invoke a network call client through the communication client according to the access link, and access the chat room through the network call client according to a second communication identifier, and the second communication identifier being a communication identifier corresponding to the network call client.

In one embodiment, the first communication identifier includes an email address, and the communication client corresponding to the email address is an email transceiver client; and/or the first communication identifier includes a phone number, and the communication client corresponding to the phone number is an SMS client; and/or the first communication identifier includes a social network account number, the communication client corresponding to the social network account number is a social network client, and the social network client is different from the network call client.

In one embodiment, the first transmitting module 1904 includes: a first transmitting unit, a second transmitting unit, and a third transmitting unit.

The first transmitting unit is configured to transmit the call reservation notification to the email transceiver client of the call terminal according to the email address of the first call terminal.

The second transmitting unit is configured to transmit the call reservation notification to the SMS client of the call terminal according to the phone number of the first call terminal.

The third transmitting unit is configured to transmit the call reservation notification to the social network client of the call terminal according to the social network account number of the first call terminal.

In one embodiment, the reservation request further includes a caller identity of the first call terminal. The second generation module 1903 includes: a first generation unit and a second generation unit.

The first generation unit is configured to generate the access link according to the chat room identifier and the caller identity.

The second generation unit is configured to generate the call reservation notification according to the access link.

The caller identity is an identity of a call party using the first call terminal, and the caller identity is used by the first call terminal to determine a displayed name corresponding to the second communication identifier.

In one embodiment, the caller identity corresponding to the network call includes a first caller identity and a second caller identity, and the first caller identity is different from the second caller identity.

The first generation unit is further configured to: generate a first access link according to the chat room identifier and the first caller identity of the first call terminal, where the first access link is used by the first call terminal to access the chat room as the first caller identity; or generate a second access link according to the chat room identifier and the second caller identity of the first call terminal, where the second access link is used by the first call terminal to access the chat room as the second caller identity, and the second access link is different from the first access link.

In one embodiment, the network call apparatus further includes: a second receiving module, a first determining module, and a second transmitting module.

The second receiving module is configured to receive a first invocation request transmitted by the first call terminal, the first invocation request includes another second communication identifier, and the another second communication identifier is a second communication identifier in the chat room other than the second communication identifier in the first call terminal.

The first determining module is configured to determine a caller identity corresponding to the another second communication identifier according to a first correspondence, where the first correspondence includes at least a correspondence between the another second communication identifier and the caller identity.

The second transmitting module is configured to transmit the caller identity corresponding to the another second communication identifier to the first call terminal, where the caller identity is used by the network call client in the first call terminal to determine a displayed name corresponding to the another second communication identifier in the chat room.

In one embodiment, the network call apparatus further includes: a third receiving module, a second determining module, a third determining module, and a third transmitting module.

The third receiving module is configured to receive a second invocation request transmitted by the first call terminal, where the second invocation request includes the second communication identifier in the first call terminal.

The second determining module is configured to determine the caller identity corresponding to the second communication identifier according to a first correspondence, where the first correspondence includes at least a correspondence between the second communication identifier and the caller identity.

The third determining module is configured to obtain a join notification corresponding to the caller identity according to a second correspondence, where the second correspondence includes at least a correspondence between the caller identity and the join notification.

The third transmitting module is configured to transmit the join notification to the first call terminal, where the join notification is used by the network call client to notify that a corresponding call party successfully joins the chat room as the caller identity.

In one embodiment, the network call apparatus further includes: a fourth receiving module and a fourth transmitting module.

The fourth receiving module is configured to receive a third invocation request transmitted by the first call terminal, where the third invocation request includes the access link.

The fourth transmitting module is configured to transmit a jump page and a web page invocation component that correspond to the access link to the first call terminal according to the third invocation request, where the jump page is used for prompting that the network call client is being invoked; and the web page invocation component in configured to load and run a web page client corresponding to the network call client in response to a failure to invoke the network call client.

In one embodiment, the network call apparatus further includes: a fifth receiving module and a fifth transmitting module.

The fifth receiving module is configured to receive a third invocation request transmitted by the first call terminal, where the third invocation request includes the access link.

The fifth transmitting module is configured to transmit a jump page corresponding to the access link to the first call terminal according to the third invocation request, where a download address of the network call client is displayed on the jump page, and the download address is used by the first call terminal to install the network call client according to the download address when the network call client is not installed.

In one embodiment, the at least two call terminals further include a second call terminal, the reservation request further includes the second communication identifier of the second call terminal, and a network call client is installed in the second call terminal.

The network call apparatus further includes a sixth transmitting module.

The sixth transmitting module is configured to transmit the call reservation notification to the network call client of the second call terminal according to the second communication identifier of the second call terminal, where the network call client accesses the chat room by using the second communication identifier.

In one embodiment, the reservation request includes a reservation time period of the network call, and an active time period of the chat room is determined according to the reservation time period.

In one embodiment, the first receiving module 1901 is further configured to receive a reservation request transmitted by a call reservation terminal.

The first generation module 1902 is further configured to generate a chat room identifier of a chat room according to the reservation request, the chat room being used by at least two call terminals to perform a network call.

The second generation module 1903 is configured to generate a call reservation notification, the call reservation notification including an access link generated according to the chat room identifier.

The first transmitting module 1904 is further configured to transmit the call reservation notification to the call reservation terminal, the call reservation notification being used for instructing the call reservation terminal to transmit the call reservation notification to a first call terminal according to a first communication identifier of the first call terminal.

The at least two call terminals include the first call terminal, a communication client is installed in the first call terminal, and the first communication identifier is a communication identifier corresponding to the communication client; the communication client is configured to invoke the network call client according to the access link; and the network call client is configured to access the chat room according to a second communication identifier, and the second communication identifier is a communication identifier corresponding to the network call client.

Figure 20:
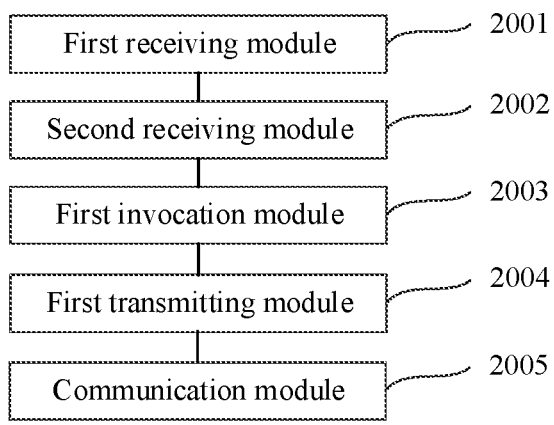
FIG. 20 is a block diagram of a network call apparatus according to an embodiment.

FIG. 20 is a block diagram of a network call apparatus according to an embodiment of this application. The network call apparatus is included in a call terminal. For an internal structure of the call terminal, refer to a structure shown in FIG. 21. Some or all of the following modules may be implemented by using software, hardware, or a combination thereof. The apparatus may include: a first receiving module 2001, a second receiving module 2002, an invocation module 2003, a transmitting module 2004, and a communication module 2005.

The first receiving module 2001 is configured to receive a call reservation notification generated by a first server, the call reservation notification including an access link, the access link being generated by the first server according to a chat room identifier of a chat room created by a second server, and the second server being configured to manage the created chat room.

The second receiving module 2002 is configured to receive a trigger operation on an access link.

The first invocation module 2003 is configured to invoke a network call client according to the access link.

The first transmitting module 2004 is configured to transmit a call access request to the second server, the call access request being used by the second server to establish a communications connection to the network call client in the chat room.

The communication module 2005 is configured to receive/transmit communication data from/to another network call client in the chat room through the second server.

In one embodiment, the communication client includes at least one of an email transceiver client, an SMS client, and a social network client.

In one embodiment, the first transmitting module 2004 includes: an obtaining unit, a first transmitting unit, a receiving unit, and a second transmitting unit.

The obtaining unit is configured to obtain the chat room identifier indicated by the access link.

The first transmitting unit is configured to transmit a chat room access request to the second server, where the chat room access request includes the chat room identifier, and the chat room identifier is used by the second server to add the network call client into the chat room.

The receiving unit is configured to receive an access acknowledgement response fed back by the second server, where the access acknowledgement response is used for indicating that the network call client successfully accesses the chat room.

The second transmitting unit is configured to transmit the call access request to the second server.

In one embodiment, the network call apparatus further includes: a second transmitting module, a first display module, a second invocation module, and a third transmitting module.

The second transmitting module is configured to transmit a third invocation request to the first server, where the third invocation request includes the access link, and the third invocation request is used for triggering the first server to transmit a jump page and a web page invocation component that correspond to the access link.

The first display module is configured to receive the jump page and the web page invocation component and display the jump page, where the jump page is used for indicating that the network call client is being invoked.

The second invocation module is configured to load and run a web page client by invoking the web page invocation component through the jump page when the network call client is not installed.

The third transmitting module is configured to transmit the call access request to the second server, where the call access request is used by the second server to establish a communications connection to the web page client in the chat room.

In one embodiment, the network call apparatus further includes: a fourth transmitting module, a second display module, and a download module.

The fourth transmitting module is configured to transmit a third invocation request to the first server by invoking a browser program, where the third invocation request includes the access link, the third invocation request is used for triggering the first server to transmit a jump page corresponding to the access link, and the jump page is used for prompting that the network call client is being invoked.

The second display module is configured to receive and display the jump page, where a download address of the network call client is displayed in the jump page.

The download module is configured to receive a trigger operation on the download address, download the network call client according to the trigger operation, and invoke the network call client; or when display duration of the jump page reaches preset duration, the browser program downloads the network call client according to the download address and invokes the network call client.

The network call apparatus provided in the foregoing embodiments is merely described by using an example of division of the foregoing functional modules. In an actual application, the foregoing functions may be allocated to and completed by different functional modules according to requirements. That is, an internal structure of the server network call apparatus is divided into different functional modules, to complete all or some of the functions described above. In addition, the network call apparatus provided in the foregoing embodiments and the embodiments of the network call method belong to the same idea. For a specific implementation process, refer to the method embodiments, and details are not further described herein.

An embodiment of this application further provides a non-volatile computer-readable storage medium. The non-volatile computer-readable storage medium may be a non-volatile computer-readable storage medium included in a memory, or may be a non-volatile computer-readable storage medium that exists independently and is not disposed in a terminal. The non-volatile computer-readable storage medium stores a computer-readable instruction. The computer-readable instruction, when executed by one or more processors in the call terminal, causes the one or more processors to perform the foregoing network call method.

An embodiment of this application further provides a non-volatile computer-readable storage medium. The non-volatile computer-readable storage medium may be a computer-readable storage medium included in a memory, or may be a non-volatile computer-readable storage medium that exists independently and is not assembled in a server. The non-volatile computer-readable storage medium stores a computer-readable instruction. The computer-readable instruction, when executed by one or more processors in the first server, causes the one or more processors to perform the foregoing network call method.

Figure 21:
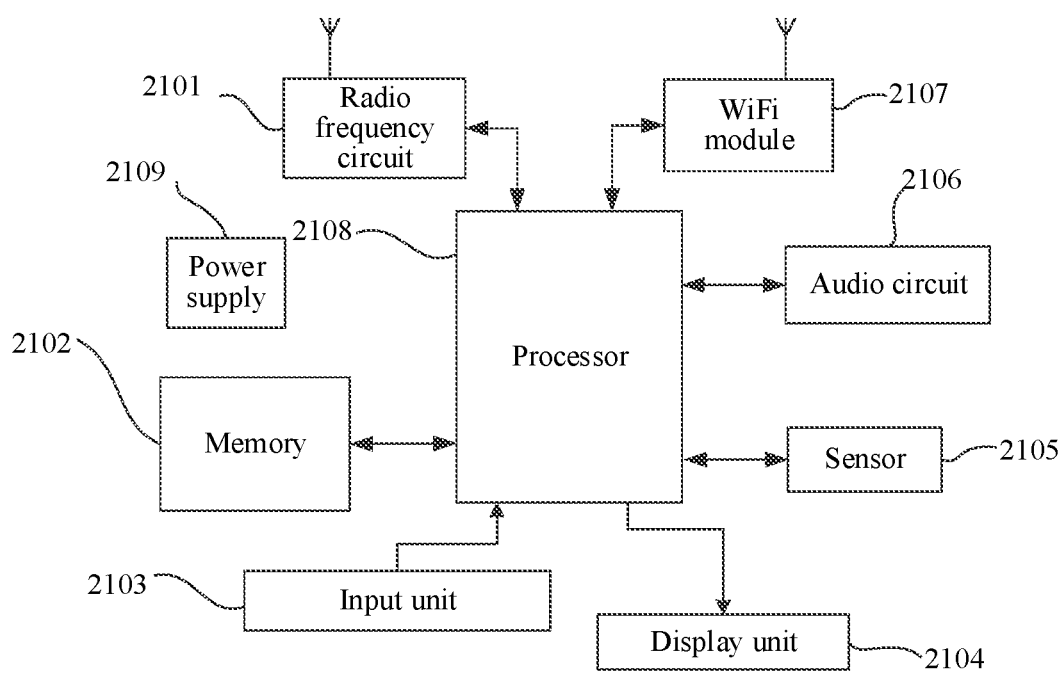
FIG. 21 is a schematic structural diagram of a terminal according to an embodiment.

FIG. 21 is a schematic structural diagram of a terminal according to an embodiment of this application. The terminal may specifically be the call terminal 520 shown in FIG. 5. The terminal may include components such as a radio frequency (RF) circuit 2101, a memory 2102 including one or more computer-readable storage mediums, an input unit 2103, a display unit 2104, a sensor 2105, an audio circuit 2106, a wireless fidelity (Wi-Fi) module 2107, a processor 2108 including one or more processing cores, and a power supply 2109. A person skilled in the art may understand that the structure of the terminal shown in FIG. 21 does not constitute a limitation to the terminal, and the terminal may include more or fewer components than those shown in the figure, or some components may be combined, or a different component deployment may be used.

The RF circuit 2101 may be configured to receive and transmit signals during an information transmitting and receiving process or a call process. Specifically, after receiving downlink information from a base station, the RF circuit 2101 delivers the downlink information to one or more processors 2108 for processing; in addition, related uplink data is transmitted to the base station. Generally, the RF circuit 2101 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 2101 may further communicate with a network and another device through wireless communication. The wireless communication may use any communications standard or protocol, which includes, but is not limited to, Global System for Mobile Communications (GSM), general packet radio service (GPRS), Code Division Multiple Access (CDMA), Wideband Code Division Multiple Access (WCDMA), Long Term Evolution (LTE), Email, SMS, and the like.

The memory 2102 may be configured to store software programs and modules, and the processor 2108 runs software programs and modules stored in the memory 2102, to implement various functional applications and data processing. The memory 2102 may mainly include a program storage area and a data storage area. The program storage area may store an operating system, an application program required by at least one function (such as a sound playback function and an image display function), and the like. The data storage area may store data (such as audio data and a phone book) created according to use of the terminal, and the like. In addition, the memory 2102 may include a high speed random access memory (RAM), and may further include a non-volatile memory, for example, at least one magnetic disk storage device, a flash memory, or another volatile solid-state storage device. Correspondingly, the memory 2102 may further include a memory controller, to provide access of the processor 2108 and the input unit 2103 to the memory 2102.

The input unit 2103 is configured to receive input digit or character information, and generate keyboard, mouse, joystick, optical, or track ball signal input related to the user setting and function control. Specifically, in a specific embodiment, the input unit 2103 may include a touch-sensitive surface and another input device. The touch-sensitive surface, which may also be referred to as a touchscreen or a touch panel, may collect a trigger operation of a user on or near the touch-sensitive surface (for example, an operation of a user on or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transmits the signal to the touch controller. The touch controller receives the touch information from the touch detection apparatus, converts the touch information into touch point coordinates, and transmits the touch point coordinates to the processor 2108. Moreover, the touch controller can receive and execute a command transmitted from the processor 2108. Besides, the touch-sensitive surface may be implemented by various types such as a resistive, a capacitive, an infrared, or a surface sound wave type. In addition to the touch-sensitive surface, the input unit 2103 may further include another input device. Specifically, this input device may include, but is not limited to, one or more of a physical keyboard, a functional key (such as a volume control key or a switch key), a track ball, a mouse, and a joystick.

The display unit 2104 is configured to display information input by the user or information provided for the user, and various graphical user interfaces of the terminal. The graphical user interfaces may be formed by a graph, a text, an icon, a video, or any combination thereof. The display unit 2104 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 2108 to determine the type of the touch event. Then, the processor 2108 provides corresponding visual output on the display panel based on the type of the touch event. Although the touch-sensitive surface and the display panel are used as two independent parts to implement input and output functions in FIG. 21, in some embodiments, the touch-sensitive surface and the display panel may be integrated to implement the input and output functions.

The terminal may further include at least one sensor 2105, such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the terminal is moved to the ear. As one type of motion sensor, a gravity sensor may detect magnitude of the accelerations at various directions (usually three axes), may detect magnitude and a direction of the gravity when static, and may be applied to an application that identifies a mobile phone gesture (for example, switching between horizontal and vertical screens, related games, and magnetometer gesture calibration), a function related to vibration identification (for example, a pedometer and a knock), and the like. The terminal may further be configured with other sensors such as a gyroscope, a barometer, a hygrometer, a thermometer, and an infrared sensor, which are not further described herein.

The audio circuit 2106, a speaker, and a microphone may provide audio interfaces between the user and the terminal. The audio circuit 2106 may convert audio data into an electric signal and transmit the electric signal to the speaker, and the speaker converts the electric signal into a sound signal for outputting. On the other hand, the microphone converts the collected sound signal into an electric signal, and the audio circuit 2106 receives the electric signal and converts the electric signal into audio data, and then outputs the audio data to the processor 2108 for processing, and then the audio data is transmitted to another terminal by using the RF circuit 2101, or the audio data is output to the memory 2102 for further processing. The audio circuit 2106 may further include an earphone jack, to provide communication between a peripheral earphone and the terminal.

Wi-Fi is a short distance wireless transmission technology. The terminal may help, by using the Wi-Fi module 2107, the user to receive and transmit emails, browse a web page, and access streaming media, which provides wireless broadband Internet access for the user. Although FIG. 21 shows the Wi-Fi module 2107, it may be understood that the Wi-Fi module 2107 is not a necessary component of the terminal, and when necessary, the Wi-Fi 2107 may be omitted as long as the scope of the essence of the present disclosure is not changed.

The processor 2108 is a control center of the terminal, and is connected to various parts of the mobile phone by using various interfaces and lines. By running or executing the software programs and/or modules stored in the memory 2102, invoking data stored in the memory 2102, and performing various functions and data processing of the terminal, to perform overall monitoring on the mobile phone. Optionally, the processor 2108 may include one or more processing cores. Preferably, the processor 2108 may integrate an application processor and a modem processor. The application processor mainly processes an operating system, a user interface, an application and the like, and the modem processor mainly processes wireless communication. It may be understood that the foregoing modem may either not be integrated into the processor 2108.

The terminal device further includes the power supply 2109 (such as a battery) for supplying power to various components. Preferably, the power supply may be logically connected to the processor 2108 by using a power management system, thereby implementing functions such as charging, discharging, and power consumption management by using the power management system. The power source 2109 may further include one or more of a direct current or alternate current power source, a recharging system, a power source fault detection circuit, a power source converter or an inverter, a power source state indicator, or any other components.

Although not shown in the figure, the terminal may further include a camera, a Bluetooth module, and the like, which are not further described herein.

Specifically, in one embodiment of this application, the memory of the terminal 2100 stores a computer-readable instruction. The computer-readable instruction, when executed by the processor of the terminal, causes the processor to implement the network call method for the user terminal.

Figure 22:
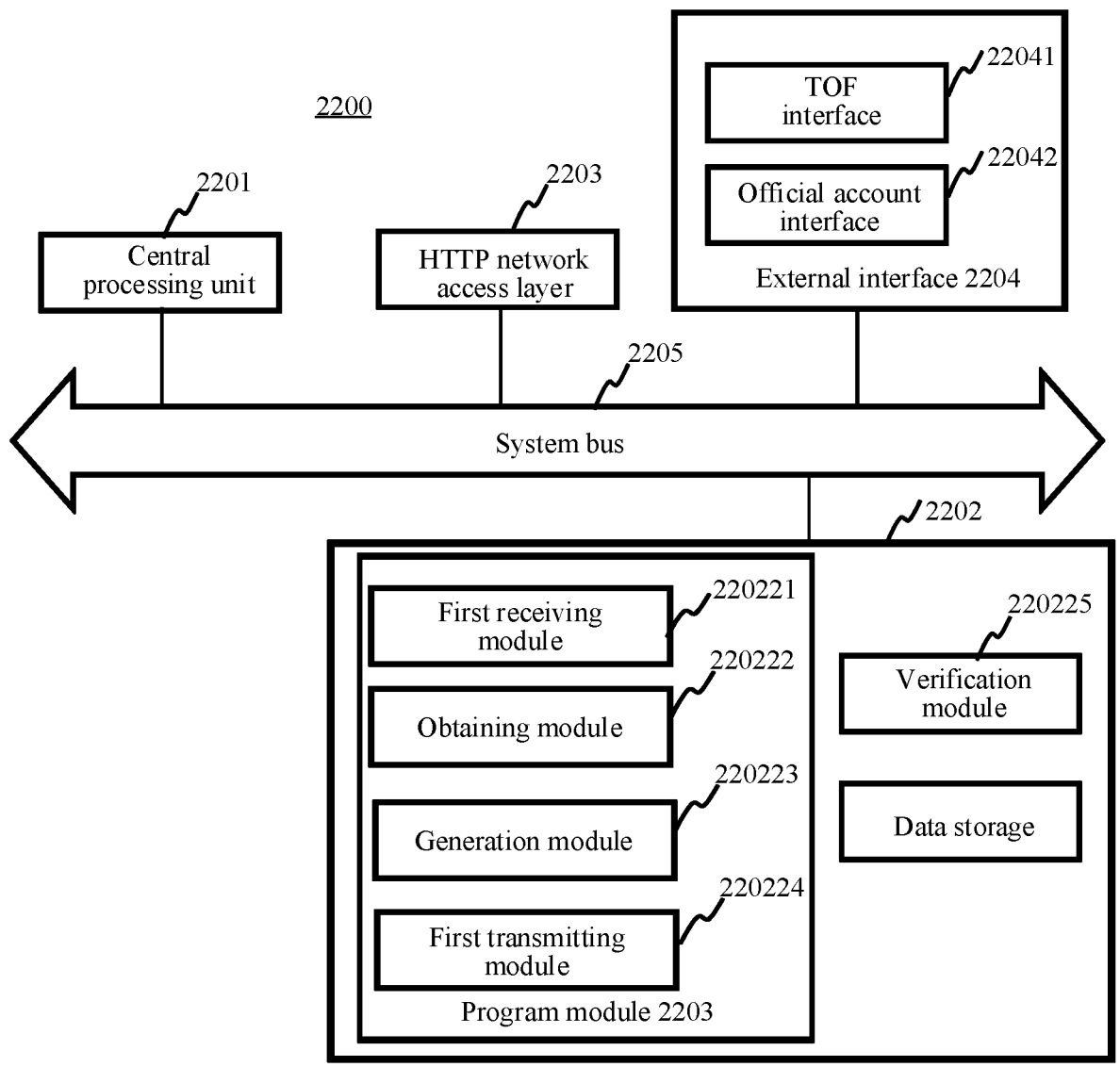
FIG. 22 is a schematic structural diagram of a server according to an embodiment.

FIG. 22 is a schematic structural diagram of a server according to an embodiment of this application. The server may specifically be the first server 530 shown in FIG. 5. A first server 2200 includes a central processing unit (CPU) 2201, a memory 2202, an HTTP network access layer 2203, an external interface 2204, and a system bus 2205.

In one embodiment, the memory 2202 stores a program module 22022, and the program module 22022 includes a first receiving module 220221, an obtaining module 220222, a generation module 220223, and a first transmitting module 220224.

In one embodiment, the memory 2202 may further store data.

In one embodiment, the memory 2202 may further include a verification module 220225, and the verification module 220225 is configured to verify validity of an account number accessing the first server.

The memory 2202 is connected to the CPU 2201 by connecting to the system bus 2205. The CPU 2201 performs the network call method provided in the foregoing method embodiments by executing a program instruction stored in the memory 2202.

The memory 2202 and an associated computer-readable medium provide non-volatile storage to the first server 2200. That is, the memory 2202 may include a computer-readable medium (not shown) such as a hard disk or a compact disc read-only memory (CD-ROM) drive.

In general, the computer-readable medium may include a computer storage medium and a communications medium. The computer storage medium includes volatile and non-volatile, removable and non-removable mediums that store information such as computer-readable instructions, data structures, program modules, or other data and that are implemented by using any method or technology. The computer storage medium includes a RAM, a read only memory (ROM), an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, it may be known by a person skilled in the art that the computer storage medium is not limited to the foregoing several types.

The HTTP network access layer 2203 is configured to receive and transmit data based on the HTTP protocol.

The external interface 2204 is configured to transmit information to different communication clients. In one embodiment, the external interface 2204 includes, but is not limited to, a time-of-flight (TOF) interface 22041 and an official account interface 22042.

Specifically, in one embodiment of this application, the memory of the server 2200 stores a computer-readable instruction. The computer-readable instruction, when executed by the processor of the server, causes the processor to implement the network call method for the first server.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. Any reference to a memory, a storage, a database, or another medium used in the various embodiments provided herein can include a non-volatile and/or volatile memory. The non-volatile memory may include a ROM, a PROM, an EPROM, an EEPROM, or a flash memory. The volatile memory may include a RAM or an external cache. As an illustration instead of a limitation, the RAM is available in various forms, such as a Static RAM (SRAM), a Dynamic RAM (DRAM), a Synchronous DRAM (SDRAM), a Double Data Rate SDRAM (DDR SDRAM), an Enhanced SDRAM (ESDRAM), Synchronous link (Synchlink) DRAM (SLDRAM), a Rambus Direct RAM (RDRAM), a Direct Rambus Dynamic RAM (DRDRAM), and a Rambus Dynamic RAM (DRAM). A person of ordinary skill in the art may understand that all or some of the steps of the embodiments may be implemented by hardware or a program instructing relevant hardware. The program may be stored in a computer-readable storage medium. The storage medium may be a ROM, a magnetic disk, or an optical disc.

The foregoing descriptions are merely preferred embodiments of this application, and are not intended to limit this application. Any modification, equivalent replacement, improvement, and the like made within the spirit and principle of this application fall within the protection scope of this application.

What is claimed is:

1. A network call method for making a call in a chat room, comprising:
   receiving, by a first server, a reservation request transmitted by a call reservation terminal, the reservation request comprising a first communication identifier of a first call terminal, a communication client being installed in the first call terminal, and the first communication identifier being a communication identifier corresponding to the communication client;
   generating, by the first server, a chat room identifier of a chat room in a social network application, the chat room being used by at least two call terminals to perform a network call, and the at least two call terminals comprising the first call terminal;
   generating, by the first server, a call reservation notification, the call reservation notification comprising an access link generated according to the chat room identifier; and
   transmitting, by the first server, the call reservation notification to the first call terminal according to the first communication identifier, the call reservation notification being used for instructing the first call terminal to invoke a network call client through the communication client according to the access link, and to access the chat room in a social network application through the network call client according to a second communication identifier, and the second communication identifier being a communication identifier corresponding to the network call client, wherein the network call client is a client application of the social network application and the call reservation terminal and the first call terminal are not friends in the in the social network application.

2. The method according to claim 1, wherein:
   the first communication identifier comprises an email address, and the communication client corresponding to the email address is an email transceiver client;
   or
   the first communication identifier comprises a phone number, and the communication client corresponding to the phone number is a short message service (SMS) client;
   or
   the first communication identifier comprises a social network account number, the communication client corresponding to the social network account number is a social network client, and the social network client is different from the network call client.

3. The method according to claim 1, wherein the reservation request further comprises a caller identity of the first call terminal; and
   the generating, by the first server, a call reservation notification comprises:
   generating, by the first server, the access link according to the chat room identifier and the caller identity; and
   generating, by the first server, the call reservation notification according to the access link, wherein
   the caller identity is an identity of a call party using the first call terminal in the chat room, and the caller identity is used by the first call terminal to determine a displayed name corresponding to the second communication identifier.

4. The method according to claim 3, wherein the caller identity corresponding to the network call comprises a first caller identity and a second caller identity, and the first caller identity is different from the second caller identity; and
   the generating, by the first server, the access link according to the chat room identifier and the caller identity comprises:
   generating, by the first server, a first access link according to the chat room identifier and the first caller identity of the first call terminal, wherein the first access link is used by the first call terminal to access the chat room as the first caller identity;
   or
   generating, by the first server, a second access link according to the chat room identifier and the second caller identity of the first call terminal, wherein the second access link is used by the first call terminal to access the chat room as the second caller identity, and the second access link is different from the first access link.

5. The method according to claim 1, wherein after the transmitting, by the first server, the call reservation notification to the first call terminal according to the first communication identifier, the method further comprises:
   receiving, by the first server, a first invocation request transmitted by the first call terminal, wherein the first invocation request comprises at least another second communication identifier, and the another second communication identifier is a second communication identifier in the chat room other than the second communication identifier in the first call terminal;
   determining, by the first server, a caller identity corresponding to the another second communication identifier according to a first correspondence, wherein the first correspondence comprises at least a correspondence between the another second communication identifier and the caller identity; and
   transmitting, by the first server, the caller identity corresponding to the another second communication identifier to the first call terminal, wherein the caller identity is used by the network call client in the first call terminal to determine a displayed name corresponding to the another second communication identifier in the chat room.

6. The method according to claim 1, wherein after the transmitting, by the first server, the call reservation notification to the first call terminal according to the first communication identifier, the method further comprises:
   receiving, by the first server, a second invocation request transmitted by the first call terminal, wherein the second invocation request comprises the second communication identifier in the first call terminal;

determining, by the first server, a caller identity corresponding to the second communication identifier according to a first correspondence, wherein the first correspondence comprises at least a correspondence between the second communication identifier and the caller identity;

obtaining, by the first server, a join notification corresponding to the caller identity according to a second correspondence, wherein the second correspondence comprises at least a correspondence between the caller identity and the join notification; and transmitting, by the first server, the join notification to the first call terminal, wherein the join notification is used by the network call client to notify that a corresponding call party has joined the chat room as the caller identity.

7. The method according to claim 1, wherein after the transmitting, by the first server, the call reservation notification to the first call terminal according to the first communication identifier, the method further comprises:

receiving, by the first server, a third invocation request transmitted by the first call terminal, wherein the third invocation request comprises the access link; and transmitting, by the first server, a jump page and a web page invocation component that correspond to the access link to the first call terminal according to the third invocation request, wherein the jump page is used for prompting that the network call client is being invoked, and the web page invocation component is configured to load and run a web page client corresponding to the network call client in response to a failure to invoke the network call client.

8. The method according to claim 1, wherein the at least two call terminals further comprise a second call terminal, the reservation request further comprises a second communication identifier of the second call terminal, and the network call client is installed in the second call terminal.

9. The method according to claim 8, wherein after the generating, by the first server, a call reservation notification, the method further comprises:

transmitting, by the first server, the call reservation notification to the network call client of the second call terminal according to the second communication identifier of the second call terminal, wherein the call reservation notification is further used for instructing the second call terminal to access the chat room through the network call client according to the second communication identifier of the second call terminal.

10. A first server, comprising:
a storage medium storing computer instructions; and
a processor coupled to the storage medium and configured to execute the computer instructions to:
receive the reservation request transmitted by a call reservation terminal, the reservation request comprising a first communication identifier of a first call terminal, a communication client being installed in the first call terminal, and the first communication identifier being a communication identifier corresponding to the communication client;
generate a chat room identifier of a chat room, the chat room being used by at least two call terminals to perform a network call, and the at least two call terminals comprising the first call terminal;
generate a call reservation notification, the call reservation notification comprising an access link generated according to the chat room identifier; and
transmit the call reservation notification to the first call terminal according to the first communication identifier, the call reservation notification being used for instructing the first call terminal to invoke a network call client through the communication client according to the access link, and access the chat room through the network call client according to a second communication identifier, and the second communication identifier being a communication identifier corresponding to the network call client.

11. The first server according to claim 10, wherein the reservation request further comprises a caller identity of the first call terminal; and the processor is further configured to:
generate the access link according to the chat room identifier and the caller identity; and
generate the call reservation notification according to the access link, wherein
the caller identity is an identity of a call party using the first call terminal in the chat room, and the caller identity is used by the first call terminal to determine a displayed name corresponding to the second communication identifier.

12. The first server according to claim 11, wherein the caller identity corresponding to the network call comprises a first caller identity and a second caller identity, and the first caller identity is different from the second caller identity; and
the processor being configured to generate the access link according to the chat room identifier and the caller identity comprises:
generating a first access link according to the chat room identifier and the first caller identity of the first call terminal, wherein the first access link is used by the first call terminal to access the chat room as the first caller identity; or
generating a second access link according to the chat room identifier and the second caller identity of the first call terminal, wherein the second access link is used by the first call terminal to access the chat room as the second caller identity, and the second access link is different from the first access link.

13. The first server according to claim 10, wherein after transmitting the call reservation notification to the first call terminal according to the first communication identifier, the processor is further configured to:
receive a first invocation request transmitted by the first call terminal, wherein the first invocation request comprises at least another second communication identifier, and the another second communication identifier is a second communication identifier in the chat room other than the second communication identifier in the first call terminal;
determine a caller identity corresponding to the another second communication identifier according to a first correspondence, wherein the first correspondence comprises at least a correspondence between the another second communication identifier and the caller identity; and
transmit the caller identity corresponding to the another second communication identifier to the first call terminal, wherein the caller identity is used by the network call client in the first call terminal to determine a displayed name corresponding to the another second communication identifier in the chat room.

14. The first server according to claim 10, wherein after transmitting the call reservation notification to the first call terminal according to the first communication identifier, the processor is further configured to:

receive a second invocation request transmitted by the first call terminal, wherein the second invocation request comprises the second communication identifier in the first call terminal;

determine a caller identity corresponding to the second communication identifier according to a first correspondence, wherein the first correspondence comprises at least a correspondence between the second communication identifier and the caller identity;

obtain a join notification corresponding to the caller identity according to a second correspondence, wherein the second correspondence comprises at least a correspondence between the caller identity and the join notification; and transmit the join notification to the first call terminal, wherein the join notification is used by the network call client to notify that a corresponding call party has joined the chat room as the caller identity.

15. The first server according to claim 10, wherein after transmitting the call reservation notification to the first call terminal according to the first communication identifier, the processor is further configured to:

receive a third invocation request transmitted by the first call terminal, wherein the third invocation request comprises the access link; and transmit a jump page and a web page invocation component that correspond to the access link to the first call terminal according to the third invocation request, wherein the jump page is used for prompting that the network call client is being invoked, and the web page invocation component is configured to load and run a web page client corresponding to the network call client in response to a failure to invoke the network call client.

16. The first server according to claim 10, wherein the at least two call terminals further comprise a second call terminal, the reservation request further comprises a second communication identifier of the second call terminal, and the network call client is installed in the second call terminal.

17. The first server according to claim 16, wherein after generating a call reservation notification, the processor is further configured to:

transmit the call reservation notification to the network call client of the second call terminal according to the second communication identifier of the second call terminal, wherein the call reservation notification is further used for instructing the second call terminal to access the chat room through the network call client according to the second communication identifier of the second call terminal.

18. The first server according to claim 10, wherein the network call client is a client application of the social network application and the call reservation terminal and the first call terminal are not friends in the in the social network application.

19. The first server according to claim 10, wherein the first communication identifier comprises an email address, and the communication client corresponding to the email address is an email transceiver client;

or the first communication identifier comprises a phone number, and the communication client corresponding to the phone number is a short message service (SMS) client;

or the first communication identifier comprises a social network account number, the communication client corresponding to the social network account number is a social network client, and the social network client is different from the network call client.

20. A non-transitory storage medium storing computer instructions, the computer instructions, when being executed by a processor of a first server, causing the processor to perform:

receiving a reservation request transmitted by a call reservation terminal, the reservation request comprising a first communication identifier of a first call terminal, a communication client being installed in the first call terminal, and the first communication identifier being a communication identifier corresponding to the communication client;

generating a chat room identifier of a chat room in a social network application, the chat room being used by at least two call terminals to perform a network call, and the at least two call terminals comprising the first call terminal;

generating a call reservation notification, the call reservation notification comprising an access link generated according to the chat room identifier; and transmitting the call reservation notification to the first call terminal according to the first communication identifier, the call reservation notification being used for instructing the first call terminal to invoke a network call client through the communication client according to the access link, and to access the chat room in a social network application through the network call client according to a second communication identifier, and the second communication identifier being a communication identifier corresponding to the network call client.

* * * * *